US012697843B2

(12) United States Patent
Koda et al.

(10) Patent No.: US 12,697,843 B2
(45) Date of Patent: Aug. 4, 2026

(54) TIRE

(71) Applicant: The Yokohama Rubber Co., LTD., Kanagawa (JP)

(72) Inventors: Hiraku Koda, Kanagawa (JP); Haruka Tateno, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 154 days.

(21) Appl. No.: 18/546,860

(22) PCT Filed: Feb. 22, 2022

(86) PCT No.: PCT/JP2022/007416
§ 371 (c)(1),
(2) Date: Aug. 17, 2023

(87) PCT Pub. No.: WO2022/177030
PCT Pub. Date: Aug. 25, 2022

(65) Prior Publication Data
US 2024/0308277 A1 Sep. 19, 2024

(30) Foreign Application Priority Data
Feb. 22, 2021 (JP) ................................ 2021-026829

(51) Int. Cl.
*B60C 9/02* (2006.01)
*B60C 3/04* (2006.01)
(Continued)

(52) U.S. Cl.
CPC ................ *B60C 15/04* (2013.01); *B60C 3/04* (2013.01); *B60C 11/0083* (2013.01);
(Continued)

(58) Field of Classification Search
CPC ............. B60C 11/01; B60C 2009/0475; B60C 2009/045; B60C 2009/0441;
(Continued)

(56) References Cited

U.S. PATENT DOCUMENTS

2002/0009608 A1* 1/2002 Nishikawa ............. D07B 1/062
152/451
2009/0301629 A1* 12/2009 Zuigyo ................. B60C 9/0042
152/560
(Continued)

FOREIGN PATENT DOCUMENTS

CN 102791497 A 11/2012
CN 108284711 A 7/2018
(Continued)

*Primary Examiner* — Cedrick S Williams
(74) *Attorney, Agent, or Firm* — Thorpe North & Western, LLP

(57) ABSTRACT

A tire includes a pair of bead cores, a carcass layer extending between the bead cores, and a belt layer disposed on an outer side of the carcass layer in a radial direction. A tire outer diameter OD (mm) is in a range $200 \leq OD \leq 660$. A total tire width SW (mm) is in a range $100 \leq SW \leq 400$. A strength Tcs (N/50 mm) per a width of 50 mm of a carcass ply constituting the carcass layer is in a range $17 \leq Tcs/OD \leq 120$ with respect to the tire outer diameter OD (mm).

19 Claims, 13 Drawing Sheets

(51) Int. Cl.
| | |
|---|---|
| *B60C 11/00* | (2006.01) |
| *B60C 11/13* | (2006.01) |
| *B60C 13/00* | (2006.01) |
| *B60C 15/00* | (2006.01) |
| *B60C 15/04* | (2006.01) |

(52) U.S. Cl.
CPC .............. *B60C 11/13* (2013.01); *B60C 13/00* (2013.01); *B60C 15/0036* (2013.01); *B60C 2011/0033* (2013.01); *B60C 2013/007* (2013.01)

(58) Field of Classification Search
CPC .... B60C 2009/0425; B60C 2009/0416; B60C 9/04; B60C 9/02
See application file for complete search history.

(56) References Cited

U.S. PATENT DOCUMENTS

| | | | |
|---|---|---|---|
| 2012/0247639 A1 | 10/2012 | Yoshimi | |
| 2014/0138003 A1* | 5/2014 | Kuwayama | ............... B60C 3/04 |
| | | | 152/454 |

| | | | | | |
|---|---|---|---|---|---|
| 2017/0274710 A1* | 9/2017 | Matsumoto | ........... B60C 9/2204 |

FOREIGN PATENT DOCUMENTS

| | | | | | | |
|---|---|---|---|---|---|---|
| EP | 679543 A1 | * | 11/1995 | ........... B60C 9/2006 |
| JP | 63-265704 A | | 11/1988 | |
| JP | 7-81308 A | | 3/1995 | |
| JP | 9-226313 A | | 9/1997 | |
| JP | 2002-88666 A | | 3/2002 | |
| JP | 2005-343334 A | | 12/2005 | |
| JP | 2013-199195 A | | 10/2013 | |
| JP | 2015160440 A | * | 9/2015 | |
| JP | 2018069887 A | * | 5/2018 | |
| JP | 2018111360 A | * | 7/2018 | ......... B60C 11/1272 |
| JP | 2022-19516 A | | 1/2022 | |
| RU | 2712475 C1 | * | 1/2020 | .............. B60C 9/04 |
| WO | WO-2004090023 A1 | * | 10/2004 | .............. B60C 1/00 |
| WO | 2011/074676 A1 | | 6/2011 | |
| WO | 2013/042255 A1 | | 3/2013 | |
| WO | 2014/010348 A1 | | 1/2014 | |
| WO | 2020/122165 A1 | | 6/2020 | |
| WO | 2020/122169 A1 | | 6/2020 | |
| WO | 2021/065511 A1 | | 4/2021 | |

* cited by examiner

| | COMPARATIVE EXAMPLE | EXAMPLE 1 | EXAMPLE 2 | EXAMPLE 3 | EXAMPLE 4 | EXAMPLE 5 | EXAMPLE 6 |
|---|---|---|---|---|---|---|---|
| OD (mm) | 531 | 531 | 531 | 531 | 531 | 531 | 480 |
| SW (mm) | 143 | 143 | 143 | 143 | 143 | 143 | 235 |
| TW (mm) | 123 | 123 | 123 | 123 | 123 | 123 | 211 |
| RD (mm) | 305 | 305 | 305 | 305 | 305 | 305 | 254 |
| SW/OD | 0.27 | 0.27 | 0.27 | 0.27 | 0.27 | 0.27 | 0.49 |
| TW/SW | 0.86 | 0.86 | 0.86 | 0.86 | 0.86 | 0.86 | 0.90 |
| MATERIAL OF CARCASS CORD | POLYESTER FIBER | POLYESTER FIBER | POLYESTER FIBER | STEEL | STEEL | STEEL | STEEL |
| Tcs/OD | 11 | 18 | 68 | 19 | 38 | 66 | 42 |
| Tcs/SW | 41 | 65 | 252 | 70 | 140 | 245 | 85 |
| Hcs/SH | 0.48 | 0.48 | 0.48 | 0.48 | 0.48 | 0.48 | 0.48 |
| Hcs'/SH | 0.10 | 0.10 | 0.10 | 0.10 | 0.10 | 0.10 | 0.10 |
| MATERIAL OF BELT CORD | ARAMID FIBER | ARAMID FIBER | ARAMID FIBER | ARAMID FIBER | ARAMID FIBER | ARAMID FIBER | ARAMID FIBER |
| Tbt/OD | 23 | 47 | 47 | 47 | 47 | 47 | 25 |
| Tbt/SW | 85 | 173 | 173 | 173 | 173 | 173 | 51 |
| MATERIAL OF BEAD WIRE | STEEL | STEEL | STEEL | STEEL | STEEL | STEEL | STEEL |
| Tbd/OD | 38 | 75 | 75 | 75 | 75 | 75 | 75 |
| Tbd/SW | 140 | 280 | 280 | 280 | 280 | 280 | 280 |
| Tsh/Tu | 7.00 | 7.00 | 7.00 | 7.00 | 7.00 | 7.00 | 7.00 |
| $\Delta Bu'/\Delta Au'$ | 1.00 | 1.00 | 1.00 | 1.00 | 1.00 | 1.00 | 1.00 |
| $\Delta Bl'/\Delta Al'$ | 2.30 | 2.30 | 2.30 | 2.30 | 2.30 | 2.30 | 2.30 |
| DA/TW | 0.053 | 0.053 | 0.053 | 0.053 | 0.053 | 0.053 | 0.053 |
| CRw/TRw | 1.00 | 1.00 | 1.00 | 1.00 | 1.00 | 1.00 | 1.00 |
| Tsh/Tce | 1.08 | 1.08 | 1.08 | 1.08 | 1.08 | 1.08 | 1.08 |
| LOW ROLLING RESISTANCE PERFORMANCE | 100 | 103 | 100 | 103 | 102 | 100 | 105 |
| WEAR RESISTANCE PERFORMANCE | 100 | 100 | 100 | 100 | 100 | 100 | 105 |
| DURABILITY PERFORMANCE | 100 | 110 | 120 | 110 | 115 | 120 | 110 |

FIG. 8A

|  | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|
| OD (mm) | 464 | 547 | 531 | 531 | 531 | 531 | 531 |
| SW (mm) | 235 | 143 | 143 | 143 | 143 | 143 | 143 |
| TW (mm) | 211 | 123 | 123 | 123 | 123 | 123 | 123 |
| RD (mm) | 254 | 305 | 305 | 305 | 305 | 305 | 305 |
| SW/OD | 0.51 | 0.26 | 0.27 | 0.27 | 0.27 | 0.27 | 0.27 |
| TW/SW | 0.90 | 0.86 | 0.86 | 0.86 | 0.86 | 0.86 | 0.86 |
| MATERIAL OF CARCASS CORD | STEEL | STEEL | STEEL | STEEL | STEEL | STEEL | STEEL |
| Tcs/OD | 43 | 37 | 38 | 38 | 38 | 38 | 38 |
| Tcs/SW | 85 | 140 | 140 | 140 | 140 | 140 | 140 |
| Hcs/SH | 0.48 | 0.48 | 0.50 | 0.66 | 0.75 | 0.66 | 0.66 |
| Hcs'/SH | 0.10 | 0.10 | 0.13 | 0.13 | 0.13 | 0.08 | 0.33 |
| MATERIAL OF BELT CORD | ARAMID FIBER | ARAMID FIBER | ARAMID FIBER | ARAMID FIBER | ARAMID FIBER | ARAMID FIBER | ARAMID FIBER |
| Tbt/OD | 26 | 22 | 47 | 47 | 47 | 47 | 47 |
| Tbt/SW | 51 | 85 | 173 | 173 | 173 | 173 | 173 |
| MATERIAL OF BEAD WIRE | STEEL | STEEL | STEEL | STEEL | STEEL | STEEL | STEEL |
| Tbd/OD | 75 | 75 | 75 | 75 | 75 | 75 | 75 |
| Tbd/SW | 280 | 280 | 280 | 280 | 280 | 280 | 280 |
| Tsh/Tu | 7.00 | 7.00 | 7.00 | 7.00 | 7.00 | 7.00 | 7.00 |
| $\Delta Bu'/\Delta Au'$ | 1.00 | 1.00 | 1.00 | 1.00 | 1.00 | 1.00 | 1.00 |
| $\Delta Bl'/\Delta Al'$ | 2.30 | 2.30 | 2.30 | 2.30 | 2.30 | 2.30 | 2.30 |
| DA/TW | 0.053 | 0.053 | 0.053 | 0.053 | 0.053 | 0.053 | 0.053 |
| CRw/TRw | 1.00 | 1.00 | 1.00 | 1.00 | 1.00 | 1.00 | 1.00 |
| Tsh/Tce | 1.08 | 1.08 | 1.08 | 1.08 | 1.08 | 1.08 | 1.08 |
| LOW ROLLING RESISTANCE PERFORMANCE | 107 | 100 | 102 | 101 | 100 | 100 | 104 |
| WEAR RESISTANCE PERFORMANCE | 105 | 100 | 100 | 100 | 100 | 100 | 100 |
| DURABILITY PERFORMANCE | 108 | 116 | 115 | 117 | 120 | 125 | 113 |

FIG. 8B

| | EXAMPLE 14 | EXAMPLE 15 | EXAMPLE 16 | EXAMPLE 17 | EXAMPLE 18 | EXAMPLE 19 | EXAMPLE 20 |
|---|---|---|---|---|---|---|---|
| OD (mm) | 531 | 531 | 531 | 531 | 531 | 531 | 531 |
| SW (mm) | 143 | 143 | 143 | 143 | 143 | 143 | 143 |
| TW (mm) | 123 | 123 | 123 | 123 | 123 | 123 | 123 |
| RD (mm) | 305 | 305 | 305 | 305 | 305 | 305 | 305 |
| SW/OD | 0.27 | 0.27 | 0.27 | 0.27 | 0.27 | 0.27 | 0.27 |
| TW/SW | 0.86 | 0.86 | 0.86 | 0.86 | 0.86 | 0.86 | 0.86 |
| MATERIAL OF CARCASS CORD | STEEL | STEEL | STEEL | STEEL | STEEL | STEEL | STEEL |
| Tcs/OD | 38 | 38 | 38 | 38 | 38 | 38 | 38 |
| Tcs/SW | 140 | 140 | 140 | 140 | 140 | 140 | 140 |
| Hcs/SH | 0.66 | 0.66 | 0.66 | 0.66 | 0.66 | 0.66 | 0.66 |
| Hcs'/SH | 0.33 | 0.33 | 0.33 | 0.33 | 0.33 | 0.33 | 0.33 |
| MATERIAL OF BELT CORD | ARAMID FIBER | ARAMID FIBER | STEEL | STEEL | STEEL | STEEL | STEEL |
| Tbt/OD | 30 | 102 | 38 | 104 | 129 | 104 | 104 |
| Tbt/SW | 110 | 378 | 140 | 385 | 481 | 385 | 385 |
| MATERIAL OF BEAD WIRE | STEEL | STEEL | STEEL | STEEL | STEEL | STEEL | STEEL |
| Tbd/OD | 75 | 75 | 75 | 75 | 75 | 47 | 68 |
| Tbd/SW | 280 | 280 | 280 | 280 | 280 | 175 | 252 |
| Tsh/Tu | 7.00 | 7.00 | 7.00 | 7.00 | 7.00 | 7.00 | 7.00 |
| ΔBu'/ΔAu' | 1.00 | 1.00 | 1.00 | 1.00 | 1.00 | 1.00 | 1.00 |
| ΔBl'/ΔAl' | 2.30 | 2.30 | 2.30 | 2.30 | 2.30 | 2.30 | 2.30 |
| DA/TW | 0.053 | 0.053 | 0.053 | 0.053 | 0.053 | 0.053 | 0.053 |
| CRw/TRw | 1.00 | 1.00 | 1.00 | 1.00 | 1.00 | 1.00 | 1.00 |
| Tsh/Tce | 1.08 | 1.08 | 1.08 | 1.08 | 1.08 | 1.08 | 1.08 |
| LOW ROLLING RESISTANCE PERFORMANCE | 106 | 100 | 105 | 104 | 102 | 108 | 107 |
| WEAR RESISTANCE PERFORMANCE | 100 | 100 | 100 | 100 | 100 | 100 | 100 |
| DURABILITY PERFORMANCE | 110 | 124 | 115 | 125 | 129 | 118 | 125 |

FIG. 9A

| | EXAMPLE 21 | EXAMPLE 22 | EXAMPLE 23 | EXAMPLE 24 | EXAMPLE 25 | EXAMPLE 26 |
|---|---|---|---|---|---|---|
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| MATERIAL OF CARCASS CORD | STEEL | STEEL | STEEL | STEEL | STEEL | STEEL |
| Tcs/OD | 38 | 38 | 38 | 38 | 38 | 38 |
| Tcs/SW | 140 | 140 | 140 | 140 | 140 | 140 |
| Hcs/SH | 0.66 | 0.66 | 0.66 | 0.66 | 0.66 | 0.66 |
| Hcs'/SH | 0.33 | 0.33 | 0.33 | 0.33 | 0.33 | 0.33 |
| MATERIAL OF BELT CORD | STEEL | STEEL | STEEL | STEEL | STEEL | STEEL |
| Tbt/OD | 104 | 104 | 104 | 104 | 104 | 104 |
| Tbt/SW | 385 | 385 | 385 | 385 | 385 | 385 |
| MATERIAL OF BEAD WIRE | STEEL | STEEL | STEEL | STEEL | STEEL | STEEL |
| Tbd/OD | 104 | 68 | 68 | 68 | 68 | 68 |
| Tbd/SW | 385 | 252 | 252 | 252 | 252 | 252 |
| Tsh/Tu | 7.00 | 1.67 | 2.75 | 2.75 | 2.75 | 2.75 |
| ΔBu'/ΔAu' | 1.00 | 1.00 | 1.00 | 1.20 | 2.80 | 7.00 |
| ΔBl'/ΔAl' | 2.30 | 2.30 | 2.30 | 2.30 | 2.30 | 2.30 |
| DA/TW | 0.053 | 0.053 | 0.053 | 0.053 | 0.053 | 0.053 |
| CRw/TRw | 1.00 | 1.00 | 1.00 | 1.00 | 1.00 | 1.00 |
| Tsh/Tce | 1.08 | 1.08 | 1.08 | 1.08 | 1.08 | 1.08 |
| LOW ROLLING RESISTANCE PERFORMANCE | 103 | 102 | 102 | 106 | 104 | 102 |
| WEAR RESISTANCE PERFORMANCE | 100 | 100 | 103 | 103 | 103 | 103 |
| DURABILITY PERFORMANCE | 131 | 137 | 134 | 138 | 140 | 142 |

FIG. 9B

| | EXAMPLE 27 | EXAMPLE 28 | EXAMPLE 29 | EXAMPLE 30 | EXAMPLE 31 | EXAMPLE 32 |
|---|---|---|---|---|---|---|
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| MATERIAL OF CARCASS CORD | STEEL | STEEL | STEEL | STEEL | STEEL | STEEL |
| Tcs/OD | 38 | 38 | 38 | 38 | 38 | 38 |
| Tcs/SW | 140 | 140 | 140 | 140 | 140 | 140 |
| Hcs/SH | 0.66 | 0.66 | 0.66 | 0.66 | 0.66 | 0.66 |
| Hcs'/SH | 0.33 | 0.33 | 0.33 | 0.33 | 0.33 | 0.33 |
| MATERIAL OF BELT CORD | STEEL | STEEL | STEEL | STEEL | STEEL | STEEL |
| Tbt/OD | 104 | 104 | 104 | 104 | 104 | 104 |
| Tbt/SW | 385 | 385 | 385 | 385 | 385 | 385 |
| MATERIAL OF BEAD WIRE | STEEL | STEEL | STEEL | STEEL | STEEL | STEEL |
| Tbd/OD | 68 | 68 | 68 | 68 | 68 | 68 |
| Tbd/SW | 252 | 252 | 252 | 252 | 252 | 252 |
| Tsh/Tu | 2.75 | 2.75 | 2.75 | 2.75 | 2.75 | 2.75 |
| ΔBu'/ΔAu' | 2.80 | 2.80 | 2.80 | 2.80 | 2.80 | 2.80 |
| ΔBl'/ΔAl' | 2.00 | 3.00 | 9.00 | 3.00 | 3.00 | 3.00 |
| DA/TW | 0.053 | 0.053 | 0.053 | 0.019 | 0.048 | 0.059 |
| CRw/TRw | 1.00 | 1.00 | 1.00 | 1.00 | 1.00 | 1.00 |
| Tsh/Tce | 1.08 | 1.08 | 1.08 | 1.08 | 1.08 | 1.08 |
| LOW ROLLING RESISTANCE PERFORMANCE | 108 | 106 | 104 | 104 | 104 | 104 |
| WEAR RESISTANCE PERFORMANCE | 103 | 103 | 103 | 108 | 106 | 104 |
| DURABILITY PERFORMANCE | 141 | 143 | 145 | 145 | 145 | 145 |

FIG. 10A

| | EXAMPLE 33 | EXAMPLE 34 | EXAMPLE 35 | EXAMPLE 36 | EXAMPLE 37 | EXAMPLE 38 |
|---|---|---|---|---|---|---|
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| MATERIAL OF CARCASS CORD | STEEL | STEEL | STEEL | STEEL | STEEL | STEEL |
| Tcs/OD | 38 | 38 | 38 | 38 | 38 | 38 |
| Tcs/SW | 140 | 140 | 140 | 140 | 140 | 140 |
| Hcs/SH | 0.66 | 0.66 | 0.66 | 0.66 | 0.66 | 0.66 |
| Hcs'/SH | 0.33 | 0.33 | 0.33 | 0.33 | 0.33 | 0.33 |
| MATERIAL OF BELT CORD | STEEL | STEEL | STEEL | STEEL | STEEL | STEEL |
| Tbt/OD | 104 | 104 | 104 | 104 | 104 | 104 |
| Tbt/SW | 385 | 385 | 385 | 385 | 385 | 385 |
| MATERIAL OF BEAD WIRE | STEEL | STEEL | STEEL | STEEL | STEEL | STEEL |
| Tbd/OD | 68 | 68 | 68 | 68 | 68 | 68 |
| Tbd/SW | 252 | 252 | 252 | 252 | 252 | 252 |
| Tsh/Tu | 5.16 | 2.75 | 1.10 | 2.75 | 2.75 | 2.75 |
| $\Delta Bu'/\Delta Au'$ | 2.80 | 2.80 | 2.80 | 2.80 | 2.80 | 2.80 |
| $\Delta Bl'/\Delta Al'$ | 3.00 | 3.00 | 3.00 | 3.00 | 3.00 | 3.00 |
| DA/TW | 0.048 | 0.048 | 0.048 | 0.048 | 0.048 | 0.048 |
| CRw/TRw | 0.40 | 0.53 | 0.93 | 0.53 | 0.53 | 0.53 |
| Tsh/Tce | 1.08 | 1.08 | 1.08 | 1.09 | 1.20 | 1.65 |
| LOW ROLLING RESISTANCE PERFORMANCE | 106 | 105 | 103 | 100 | 108 | 109 |
| WEAR RESISTANCE PERFORMANCE | 111 | 110 | 108 | 118 | 115 | 111 |
| DURABILITY PERFORMANCE | 146 | 147 | 148 | 148 | 148 | 148 |

FIG. 10B

TIRE

TECHNICAL FIELD

The technology relates to a tire and particularly relates to a tire having a small diameter that can provide low rolling resistance performance and wear resistance performance in a compatible manner.

BACKGROUND ART

In recent years, there has been developed a small-diameter tire to be mounted on a vehicle in which a floor is lowered to expand a vehicle interior space. In such a small-diameter tire, since rotational inertia is small and a tire weight is also small, a reduction in transportation cost is expected. On the other hand, the small-diameter tire is required to have a high load capacity. Technology described in International Patent Publication No. WO 2020/122169 is a tire in the related art associated with such a problem.

SUMMARY

The technology provides a tire having a small diameter that can provide low rolling resistance performance and wear resistance performance in a compatible manner.

A tire according to the technology may include a pair of bead cores, a carcass layer, and a belt layer. The carcass layer may extend between the bead cores. The belt layer may be disposed on an outer side of the carcass layer in a radial direction. A tire outer diameter OD (mm) may be in a range $200 \leq OD \leq 660$. A total tire width SW (mm) may be in a range $100 \leq SW \leq 400$. A strength Tcs (N/50 mm) per a width of 50 mm of a carcass ply constituting the carcass layer may be in a range $17 \leq Tcs/OD \leq 120$ with respect to the tire outer diameter OD (mm).

In the tire according to the technology, since a load capacity of the carcass layer is appropriately ensured in the small-diameter tire, there is an advantage of providing wear resistance performance and low rolling resistance performance of the tire in a compatible manner. Specifically, the lower limit of the ratio Tcs/OD suppresses tire deformation during use under a high load and ensures the wear resistance performance of the tire. Additionally, use under a high internal pressure is possible, and the rolling resistance of the tire is reduced.

BRIEF DESCRIPTION OF DRAWINGS

FIGS. 8A-8B include a table showing results of performance tests of tires according to embodiments of the technology.

FIGS. 9A-9B include a table showing results of performance tests of tires according to embodiments of the technology.

FIGS. 10A-10B include a table showing results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
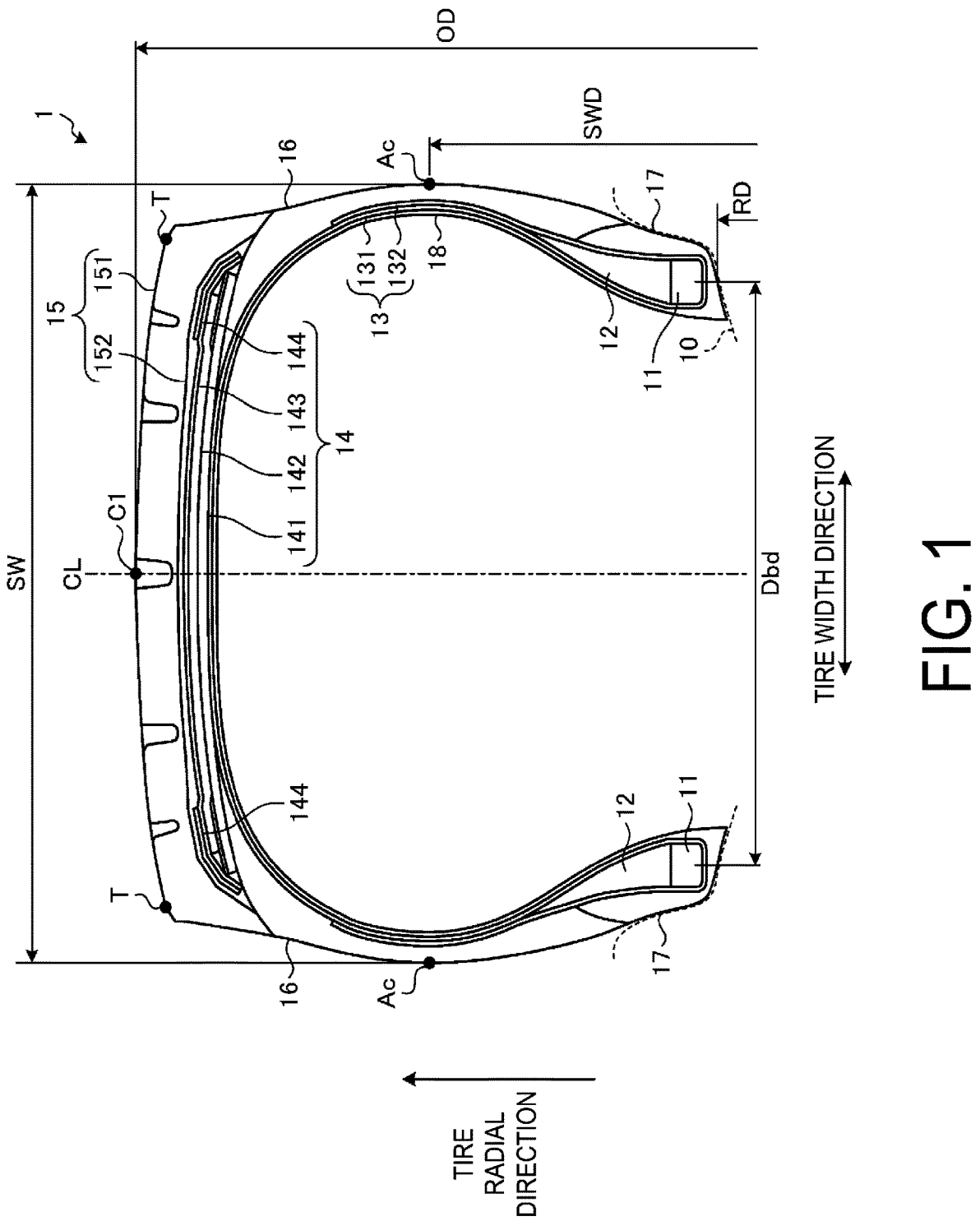
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region of the tire 1 mounted on a rim 10 in a tire radial direction. In this embodiment, a pneumatic radial tire for passenger vehicles will be described as an example of a tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis. Additionally, a point T is a tire ground contact edge, and a point Ac is a tire maximum width position.

A tire 1 includes an annular structure with the tire rotation axis serving as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 each include one or more of bead wires made of steel and made by being wound annularly multiple times, are embedded in bead portions, and constitute cores of the left and right bead portions. The pair of bead fillers 12, 12 are respectively disposed on an outer circumference of the pair of bead cores 11, 11 in the tire radial direction and reinforce the bead portions.

The carcass layer 13 has a single layer structure including one carcass ply or a multilayer structure including a plurality of carcass plies layered, extends in a toroidal shape between the left and right bead cores 11, 11, and constitutes the backbone of the tire. Both end portions of the carcass layer 13 are turned back toward outer sides in the tire width direction and fixed to wrap the bead cores 11 and the bead fillers 12. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

The belt layer 14 is made of a plurality of belt plies 141 to 144 being layered and is disposed around an outer circumference of the carcass layer 13. In the configuration of FIG. 1, the belt plies 141 to 144 are constituted by a pair of cross belts 141, 142, a belt cover 143, and a pair of belt edge covers 144, 144.

The pair of cross belts 141, 142 are constituted by covering a plurality of belt cords made of steel or an organic fiber material with a coating rubber and by performing a rolling process on the belt cords and have a cord angle (defined as an inclination angle in a longitudinal direction of the belt cords with respect to the tire circumferential direction) of 15 degrees or more and 55 degrees or less as an absolute value. Additionally, the pair of cross belts 141, 142 have a cord angle having mutually opposite signs and are layered by making the belt cords mutually intersect in the longitudinal direction of the belt cords (a so-called crossply structure). Furthermore, the pair of cross belts 141, 142 are disposed in a layered manner on an outer side in the tire radial direction of the carcass layer 13.

The belt cover 143 and the pair of belt edge covers 144, 144 are made by covering belt cover cords made of steel or an organic fiber material with a coating rubber and have a cord angle of 0 degrees or more and 10 degrees or less as an absolute value. Additionally, for example, a strip material is formed of one or a plurality of belt cover cords covered with coating rubber, and the belt cover 143 and the belt edge covers 144 are made by winding this strip material multiple times and in a spiral-like manner in the tire circumferential direction around outer circumferential surfaces of the cross belts 141, 142. Additionally, the belt cover 143 is disposed completely covering the cross belts 141, 142, and the pair of belt edge covers 144, 144 are disposed covering the left and right edge portions of the cross belts 141, 142 from the outer side in the tire radial direction.

The tread rubber 15 is disposed on an outer periphery in the tire radial direction of the carcass layer 13 and the belt layer 14 and constitutes a tread portion of the tire 1. Additionally, the tread rubber 15 includes a cap tread 151 and an undertread 152.

The cap tread 151 is made of a rubber material that is excellent in ground contact characteristics and weather resistance, and the cap tread 151 is exposed in a tread surface all across a tire ground contact surface, and constitutes an outer surface of the tread portion. The cap tread 151 has a rubber hardness Hs_cap of 50 or more and 80 or less, a modulus M_cap (MPa) at 100% elongation of 1.0 or more and 4.0 or less, and a loss tangent tan $\delta$_cap of 0.03 or more and 0.36 or less and preferably the rubber hardness Hs_cap of 58 or more and 76 or less, the modulus M_cap (MPa) at 100% elongation of 1.5 or more and 3.2 or less, and the loss tangent tan $\delta$_cap of 0.06 or more and 0.29 or less.

The rubber hardness Hs is measured in accordance with JIS (Japanese Industrial Standard) K6253 at a temperature condition of 20° C.

The modulus (strength at break) is measured by a tensile test at a temperature of 20° C. with a dumbbell-shaped test piece in accordance with JIS K6251 (using a number 3 dumbbell).

The loss tangent tan $\delta$ is measured by using a viscoelasticity spectrometer available from Toyo Seiki Seisaku-sho Ltd. at a temperature of 60° C., a shear strain of 10%, an amplitude of ±0.5%, and a frequency of 20 Hz. The undertread 152 is made of a rubber material excellent in heat resistance, is disposed by being sandwiched between the cap tread 151 and the belt layer 14, and constitutes a base portion of the tread rubber 15. The undertread 152 has a rubber hardness Hs_ut of 47 or more and 80 or less, a modulus M_ut (MPa) at 100% elongation of 1.4 or more and 5.5 or less, and a loss tangent tan $\delta$_ut of 0.02 or more and 0.23 or less and preferably the rubber hardness Hs_ut of 50 or more and 65 or less, the modulus M_ut (MPa) at 100% elongation of 1.7 or more and 3.5 or less, and the loss tangent tan $\delta$_ut of 0.03 or more and 0.10 or less.

A difference in the rubber hardness Hs_cap-Hs_ut is in the range of 3 or more to 20 or less and preferably in the range of 5 or more to 15 or less. A difference in modulus M_cap-M_ut (MPa) is in the range of 0 or more to 1.4 or less and preferably in the range of 0.1 or more to 1.0 or less. A difference in loss tangent tan $\delta$_cap-tan $\delta$_ut is in the range of 0 or more to 0.22 or less and preferably in the range of 0.02 or more to 0.16 or less.

The pair of sidewall rubbers 16, 16 are each disposed on an outer side of the carcass layer 13 in the tire width direction and constitute left and right sidewall portions. In the configuration of FIG. 1, the end portion of the sidewall rubber 16 on the outer side in the tire radial direction is disposed in the lower layer of the tread rubber 15 and is sandwiched between the end portion of the belt layer 14 and the carcass layer 13. However, no such limitation is intended, and the end portion of the sidewall rubber 16 on the outer side in the tire radial direction may be disposed in an outer layer of the tread rubber 15 and exposed in a buttress portion of the tire (not illustrated). In this case, a belt cushion (not illustrated) is sandwiched between the end portion of the belt layer 14 and the carcass layer 13.

The sidewall rubber 16 has a rubber hardness Hs_sw of 48 or more and 65 or less, a modulus M_sw (MPa) at 100% elongation of 1.0 or more and 2.4 or less, and a loss tangent tan $\delta$_sw of 0.02 or more and 0.22 or less and preferably the rubber hardness Hs_sw of 50 or more and 59 or less, the modulus M_sw (MPa) at 100% elongation of 1.2 or more and 2.2 or less, and the loss tangent tan $\delta$_sw of 0.04 or more and 0.20 or less.

The pair of rim cushion rubbers 17, 17 extend from an inner side in the tire radial direction of the left and right bead cores 11, 11 and turned back portions of the carcass layer 13 toward the outer side in the tire width direction, and constitute rim fitting surfaces of the bead portions. In the configuration of FIG. 1, an end portion on the outer side in the tire radial direction of the rim cushion rubber 17 is inserted to a lower layer of the sidewall rubber 16 and is disposed by being sandwiched between the sidewall rubber 16 and the carcass layer 13.

The innerliner 18 is an air penetration preventing layer disposed on the tire inner surface and covering the carcass layer 13, suppresses oxidation caused by exposure of the carcass layer 13, and prevents leaking of the air in the tire. Additionally, the innerliner 18 may be made of, for example, a rubber composition containing butyl rubber as a main component, or may be made of a thermoplastic resin or a thermoplastic elastomer composition containing an elastomer component blended with a thermoplastic resin or the like.

In FIG. 1, a tire outer diameter OD (mm) is in the range $200 \leq OD \leq 660$ and preferably in the range 250 mm$\leq OD \leq 580$ mm. By applying such a tire having the small diameter as a target, an effect of improving load performances described later is significantly obtained. A total tire width SW (mm) is in the range $100 \leq SW \leq 400$ and preferably in the range 105 mm$\leq SW \leq 340$ mm. In the tire 1 having the small diameter, for example, a floor of a small vehicle can be lowered to expand a vehicle interior space. Further, since rotational inertia is small and a tire weight is also small, fuel economy is improved and transportation cost is reduced. In particular, when the tire 1 is mounted on an in-wheel motor of a vehicle, a load on a motor is effectively reduced.

The tire outer diameter OD is measured when the tire is mounted on a specified rim, inflated to a specified internal pressure, and in an unloaded state. The total tire width SW is measured as a linear distance (including all portions such as letters and patterns on the tire side surface) between the sidewalls when the tire is mounted on a specified rim, inflated to a specified internal pressure, and in an unloaded state.

"Specified rim" refers to an "applicable rim" defined by the Japan Automobile Tire Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

The total tire width SW (mm) is in the range $0.23 \leq$ SW/OD $\leq 0.84$ and preferably in the range $0.25 \leq$ SW/OD $\leq 0.81$ with respect to the tire outer diameter OD (mm).

The tire outer diameter OD and the total tire width SW preferably satisfy the following mathematical formula (1). Here, A1min=−0.0017, A2min=0.9, A3min=130, A1max=−0.0019, A2max=1.4, and A3max=400 and preferably A1min=−0.0018, A2min=0.9, A3min=160, A1max=−0.0024, A2max=1.6, and A3max=362.

$$A1min * SW \wedge 2 + A2min * SW + A3min \leq \tag{1}$$

$$OD \leq A1max * SW \wedge 2 + A2max * SW + A3max$$

In the tire 1, the use of the rim 10 having a rim diameter of 5 inches or more and 16 inches or less (in other words, 125 mm or more and 407 mm or less) is assumed. A rim diameter RD (mm) is in the range $0.50 \leq$ RD/OD $\leq 0.74$ and preferably in the range $0.52 \leq$ RD/OD $\leq 0.71$ with respect to the tire outer diameter OD (mm). The lower limit can ensure the rim diameter RD and in particular, ensure an installation space for the in-wheel motor. The upper limit ensures an internal volume V of the tire described later and ensures the load capacity of the tire.

Note that the tire inner diameter is equal to the rim diameter RD of the rim 10.

The use of the tire 1 at an internal pressure higher than a specified internal pressure, specifically, an internal pressure of 350 kPa or more and 1200 kPa or less and preferably 500 kPa or more and 1000 kPa or less is assumed. The lower limit effectively reduces the rolling resistance of the tire, and the upper limit ensures safety of internal pressure inflation work.

The tire 1 is assumed to be mounted on a vehicle traveling at a low speed, such as a small shuttle bus. The maximum speed of the vehicle is 100 km/h or less, preferably 80 km/h or less, and more preferably 60 km/h or less. The tires 1 are assumed to be mounted on a vehicle having 6 to 12 wheels. As a result, the load capacity of the tire is appropriately exhibited.

An aspect ratio of the tire, in other words, a ratio between a tire cross-sectional height SH (mm) (see FIG. 2 described later) and a tire cross-sectional width (mm) (dimension symbols omitted in the drawings: same as the total tire width SW in FIG. 1) is in the range from 0.16 or more to 0.85 or less and preferably in the range from 0.19 or more to 0.82 or less.

The tire cross-sectional height SH is a distance equal to half of a difference between a tire outer diameter and a rim diameter, and is measured when the tire is mounted on a specified rim, inflated to a specified internal pressure, and in an unloaded state.

The tire cross-sectional width is measured as a linear distance between sidewalls (excluding patterns, letters, and the like on the tire side surface) when the tire is mounted on a specified rim, inflated to a specified internal pressure, and in an unloaded state.

In addition, a tire ground contact width TW is in the range $0.75 \leq$ TW/SW $\leq 0.95$ and preferably in the range $0.80 \leq$ TW/SW $\leq 0.92$ with respect to the total tire width SW.

The tire ground contact width TW is measured as a maximum linear distance in a tire axial direction in a contact surface between the tire and a flat plate when the tire is mounted on a specified rim, inflated to a specified internal pressure, placed perpendicular to the flat plate in a static state, and subjected to a load corresponding to a specified load.

The tire internal volume V (m̂3) is in the range $4.0 \leq$ (V/OD)×10^6 $\leq 60$ and preferably in the range $6.0 \leq$ (V/OD)×10^6 $\leq 50$ with respect to the tire outer diameter OD (mm). This sets the tire internal volume V appropriate. Specifically, the lower limit ensures the tire internal volume and ensures the load capacity of the tire. In particular, since the small-diameter tire is assumed to be used under a high internal pressure and a high load, the tire internal volume V is preferably sufficiently ensured. The upper limit suppresses the increase in size of the tire caused by the excessive tire internal volume V.

The tire internal volume V (m^3) is in the range $0.5 \leq$ V× RD $\leq 17$ and preferably in the range $1.0 \leq$ V×RD $\leq 15$ with respect to the rim diameter RD (mm).

Bead Core

In FIG. 1, as described above, the pair of bead cores 11, 11 are formed by winding up one or a plurality of bead wires (not illustrated) made of steel in an annular shape and multiple times. The pair of respective bead fillers 12, 12 are disposed on an outer circumference of the pair of bead cores 11, 11 in the tire radial direction.

A strength Tbd (N) of one bead core 11 is in the range $45 \leq$ Tbd/OD $\leq 120$, preferably in the range $50 \leq$ Tbd/OD $\leq 110$, and more preferably in the range $60 \leq$ Tbd/OD $\leq 105$ with respect to the tire outer diameter OD (mm). The strength Tbd (N) of the bead core is in the range $90 \leq$ Tbd/SW $\leq 400$ and preferably in the range $110 \leq$ Tbd/SW $\leq 350$ with respect to the total tire width SW (mm). As a result, the load capacity of the bead core 11 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the bead core.

The strength Tbd (N) of the bead core 11 is calculated as a product of the strength (N/piece) per bead wire and the total number of bead wires (piece) in the radial cross-sectional view. The strength of the bead wire is measured by a tensile test at a temperature of 20° C. in accordance with JIS G 3510.

The strength Tbd [N] of the bead core 11 preferably satisfies the following mathematical formula (2) with respect to the tire outer diameter OD (mm), a distance SWD (mm), and the rim diameter RD (mm). Here, B1min=0.26, B2min=10.0, B1max=2.5, and B2max=99.0, preferably B1min=0.35, B2min=14.0, B1max=2.5, and B2max=99.0, more preferably B1min=0.44, B2min=17.6, B1max=2.5, and B2max=99.0, and even more preferably B1min=0.49, B2min=17.9, B1max=2.5, and B2max=99.0. Further, B1min=0.0016×P and B2min=0.07×P are preferable with the use of a specified internal pressure P (kPa) of the tire.

$$B1\min * \{(OD/2) \wedge 2 - (SWD/2) \wedge 2\} + B2\min * RD \leq \qquad (2)$$
$$Tbd \leq B1\max * \{(OD/2) \wedge 2 - (SWD/2) \wedge 2\} + B2\max * RD$$

The distance SWD is a distance twice a radial distance from the tire rotation axis (not illustrated) to a tire maximum width position Ac, in other words, a diameter of the tire maximum width position Ac and is measured when the tire is mounted on a specified rim, inflated to a specified internal pressure, and in an unloaded state.

The tire maximum width position Ac is defined as the maximum width position of the tire cross-sectional width defined by JATMA.

In a radial cross-sectional view of one bead core 11, a total cross-sectional area σbd (m̂2) of the bead wire made of the steel described above is in the range 0.025≤σbd/OD≤0.075 and preferably in the range 0.030≤σbd/OD≤0.065 with respect to the tire outer diameter OD (mm). The total cross-sectional area σbd (m̂2) of the bead wire is in the range 11≤σbd≤36 and preferably in the range 13≤σbd≤33. As a result, the above-described strength Tbd (N) of the bead core 11 is achieved.

The total cross-sectional area σbd (m̂2) of the bead wire is calculated as the sum of the cross-sectional areas of the bead wires in the radial cross-sectional view of one bead core 11.

For example, in the configuration of FIG. 1, the bead core 11 has a quadrangular shape formed by arraying the bead wires (not illustrated) having a circular cross-section in a lattice shape. However, the configuration is not limited thereto, and the bead core 11 may have a hexagonal shape formed by arraying the bead wires having a circular cross-section in a closest-packed structure (not illustrated). In addition, any arrangement structure of bead wires can be employed within the scope of obviousness by one skilled in the art.

The total cross-sectional area σbd (m̂2) of the bead wire preferably satisfies the following mathematical formula (3) with respect to the tire outer diameter OD (mm), the distance SWD (mm), and the rim diameter RD (mm). Here, Cmin=30 and Cmax=8 and preferably Cmin=25 and Cmax=10.

$$(OD * RD)/(Cmin * SWD) \leq \sigma bd \leq (OD * RD)/(Cmax * SWD) \qquad (3)$$

The total cross-sectional area σbd (m̂2) of the bead wire is in the range 0.50≤σbd/Nbd≤1.40 and preferably in the range 0.60≤σbd/Nbd≤1.20 with respect to the total cross-sectional area (in other words, the total number of windings) Nbd (piece) of the bead wires of one bead core 11 in the radial cross-sectional view. In other words, a cross-sectional area σbd' (m̂2) of a single bead wire is in the range 0.50 m̂2/piece or more and 1.40 m̂2/piece or less and preferably in the range 0.60 m̂2/piece or more and 1.20 m̂2/piece or less.

A maximum width Wbd (mm) (see FIG. 2 described later) of one bead core 11 in the radial cross-sectional view is in the range 0.16≤Wbd/σbd≤0.50 and preferably in the range 0.20≤Wbd/σbd≤0.40 with respect to the total cross-sectional area σbd (m̂2) of the bead wire.

In FIG. 1, a distance Dbd (mm) between the centers of gravity of the pair of bead cores 11, 11 is in the range 0.63≤Dbd/SW≤0.97 and preferably in the range 0.65≤Dbd/SW≤0.95 with respect to the total tire width SW (mm). The lower limit reduces an amount of deflection of the tire and reduces the rolling resistance of the tire. The upper limit reduces stress acting on the tire side portion and suppresses a tire failure.

Carcass Layer

Figure 2:
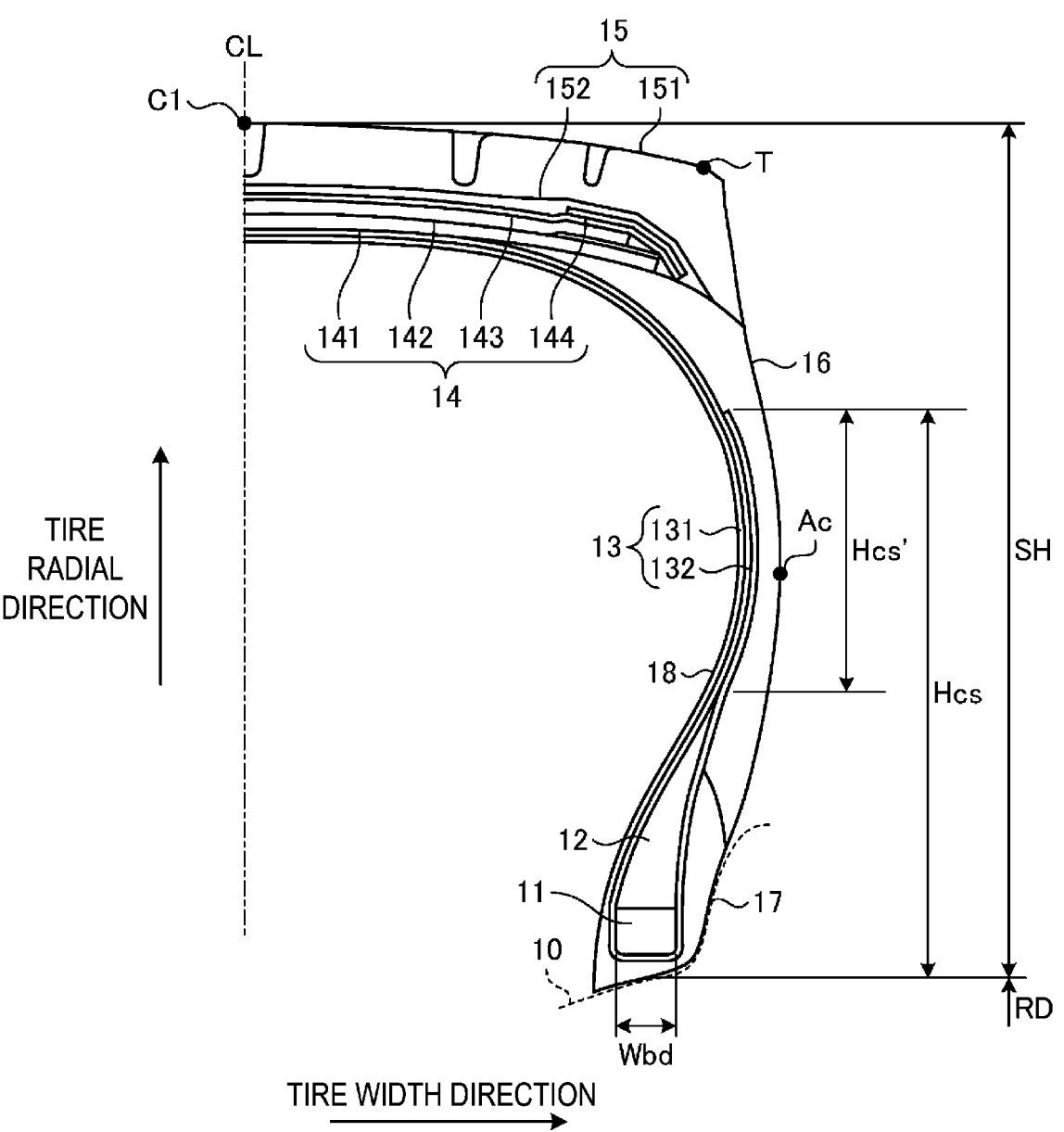
FIG. 2 is an enlarged view illustrating the tire illustrated in FIG. 1.

FIG. 2 is an enlarged view illustrating the tire 1 illustrated in FIG. 1. The same drawing illustrates the half region demarcated by the tire equatorial plane CL.

In the configuration of FIG. 1, as described above, the carcass layer 13 has a single layered carcass ply and is disposed to extend in the toroidal shape between the left and right bead cores 11, 11. Both end portions of the carcass layer 13 are turned back toward outer sides in the tire width direction and fixed to wrap the bead cores 11 and the bead fillers 12.

The strength Tcs (N/50 mm) per a width of 50 mm of the carcass ply constituting the carcass layer 13 is in the range 17≤Tcs/OD≤120 and preferably in the range 20≤Tcs/OD≤120 with respect to the tire outer diameter OD (mm). The strength Tcs (N/50 mm) of the carcass layer 13 is in the range 30≤Tcs/SW≤260 and preferably in the range 35≤Tcs/SW≤220 with respect to the total tire width SW (mm). As a result, the load capacity of the carcass layer 13 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the carcass layer.

The strength Tcs (N/50 mm) of the carcass ply is calculated as follows. In other words, the carcass ply extending between the left and right bead cores 11, 11 and extending over the entire region of the tire inner circumference is defined as an effective carcass ply. The product of the strength (N/piece) per carcass cord constituting the effective carcass ply and the number of insertions (piece/50 mm) of the carcass cords per the width of 50 mm on the tire equatorial plane CL over the entire circumference of the tire is calculated as the strength Tcs (N/50 mm) of the carcass ply. The strength of the carcass cord is measured by a tensile test at a temperature of 20° C. in accordance with JIS L 1017. For example, in a configuration in which one carcass cord is formed by intertwining, for example, a plurality of wire strands, the strength of the intertwined one carcass cord is measured, and the strength Tos of the carcass layer 13 is calculated. In a configuration in which the carcass layer 13 has a multilayer structure (not illustrated) formed by layering a plurality of the effective carcass plies, the above-described strength Tcs is defined for each of the plurality of effective carcass plies.

For example, in the configuration of FIG. 1, the carcass layer 13 has a single layer structure formed of a single carcass ply (reference sign omitted in drawings), and the carcass ply is configured by arraying carcass cords made of steel covered with a coating rubber at a cord angle of 80 degrees or more and 100 degrees or less with respect to the tire circumferential direction (not illustrated). The carcass cord made of the steel described above has a cord diameter pcs (mm) in the range $0.3≤φcs≤1.1$ and the number of insertions Ecs (piece/50 mm) in the range $25≤Ecs≤80$, whereby the above-described strength Tcs (N/50 mm) of the carcass layer 13 is achieved. The carcass cord is formed by intertwining a plurality of the wire strands, and the wire strand diameter φcss (mm) is in the range $0.12≤φcss≤0.24$ and preferably in the range $0.14≤φcss≤0.22$.

The configuration is not limited to the configuration, and the carcass ply may be constituted by a carcass cord made of an organic fiber material (for example, aramid, nylon, polyester, rayon, or the like) covered with a coating rubber. In this case, the carcass cord made of the organic fiber material has the cord diameter φcs (mm) in the range $0.6≤φcs≤0.9$ and the number of insertions Ecs (piece/50 mm) in the range $40≤Ecs≤70$, whereby the above-described strength Tcs (N/50 mm) of the carcass layer 13 is achieved. In addition, the carcass cord made of the high-strength organic fiber material, such as nylon, aramid, and hybrid, can be employed within the scope of obviousness by one skilled in the art.

The carcass layer 13 may have a multilayer structure formed by layering a plurality of carcass plies, for example, two layers (not illustrated). Accordingly, the load capacity of the tire can be effectively enhanced.

A total strength TTcs (N/50 mm) of the carcass layer 13 is in the range $300≤TTcs/OD≤3500$ and preferably in the range $400≤TTcs/OD≤3000$ with respect to the tire outer diameter OD (mm). As a result, the load capacity of the entire carcass layer 13 is ensured.

The total strength TTcs (N/50 mm) of the carcass layer 13 is calculated as the sum of the strengths Tcs (N/50 mm) of the effective carcass plies described above. Therefore, the total strength TTcs (N/50 mm) of the carcass layer 13 increases with an increase in the strength Tcs (N/50 mm) of each carcass ply, the number of layered carcass plies, a circumferential length of the carcass ply, and the like.

The total strength TTcs (N/50 mm) of the carcass layer 13 preferably satisfies the following mathematical formula (4) with respect to the tire outer diameter OD (mm) and the distance SWD (mm). Here, Dmin=2.2 and Dmax=40, preferably Dmin=4.3 and Dmax=40, more preferably Dmin=6.5 and Dmax=40, and even more preferably Dmin=8.7 and Dmax=40. Further, Dmin=0.02×P is preferable with the use of a specified internal pressure P (kPa) of the tire.

10

$$Dmin * \{(OD/2) \wedge 2 - (SWD/2) \wedge 2\} \le \qquad (4)$$
$$TTcs \le Dmax * \{(OD/2) \wedge 2 - (SWD/2) \wedge 2\}$$

In the configuration of FIG. 1, the carcass layer 13 includes a body portion 131 extending along the tire inner surface and a turned-up portion 132 turned up to the outer side in the tire width direction so as to wrap around the bead cores 11 and extending in the tire radial direction. In FIG. 2, a radial height Hcs (mm) from a measurement point of the rim diameter RD to an end portion of the turned-up portion 132 of the carcass layer 13 is in the range $0.49≤Hcs/SH≤0.80$ and preferably in the range $0.55≤Hcs/SH≤0.75$ with respect to the tire cross-sectional height SH (mm). Thus, the radial height Hcs of the turned-up portion 132 of the carcass layer 13 is made appropriate. Specifically, the lower limit ensures the load capacity of the tire side portion, and the upper limit suppresses the deterioration of the rolling resistance caused by the increase in the weight of the carcass layer.

The radial height Hcs (mm) of the turned-up portion 132 of the carcass layer 13 is measured when the tire is mounted on a specified rim, inflated to a specified internal pressure, and in an unloaded state.

For example, in the configuration of FIG. 2, the end portion (reference sign omitted in drawings) on the outer side of the turned-up portion 132 of the carcass layer 13 in the radial direction is in a region between the tire maximum width position Ac and an end portion (a point Au described later) of the belt layer 14, and more specifically, in a region from the tire maximum width position Ac to a radial position Au' at 70% of a distance Hu described later. At this time, a contact height Hcs' (mm) between the body portion 131 and the turned-up portion 132 of the carcass layer 13 is in the range $0.07≤Hcs'/SH$ and preferably in the range $0.15≤Hcs'/SH$ with respect to the tire cross-sectional height SH (mm). Accordingly, the load capacity of the tire side portion is effectively enhanced. The upper limit of the ratio Hcs'/SH is not particularly limited, but is restricted by the contact height Hcs' having the relationship Hcs'<Hcs with respect to the radial height Hcs of the turned-up portion 132 of the carcass layer 13.

The contact height Hcs' of the carcass layer 13 is an extension length in the tire radial direction of a region in which the body portion 131 and the turned-up portion 132 are in contact with one another and is measured when the tire is mounted on a specified rim, inflated to a specified internal pressure, and in an unloaded state.

The configuration is not limited to the configuration, and by the carcass layer 13 having a so-called low turn-up structure, the end portion of the turned-up portion 132 of the carcass layer 13 may be disposed in a region between the tire maximum width position Ac and the bead core (not illustrated).

Belt Layer

Figure 3:
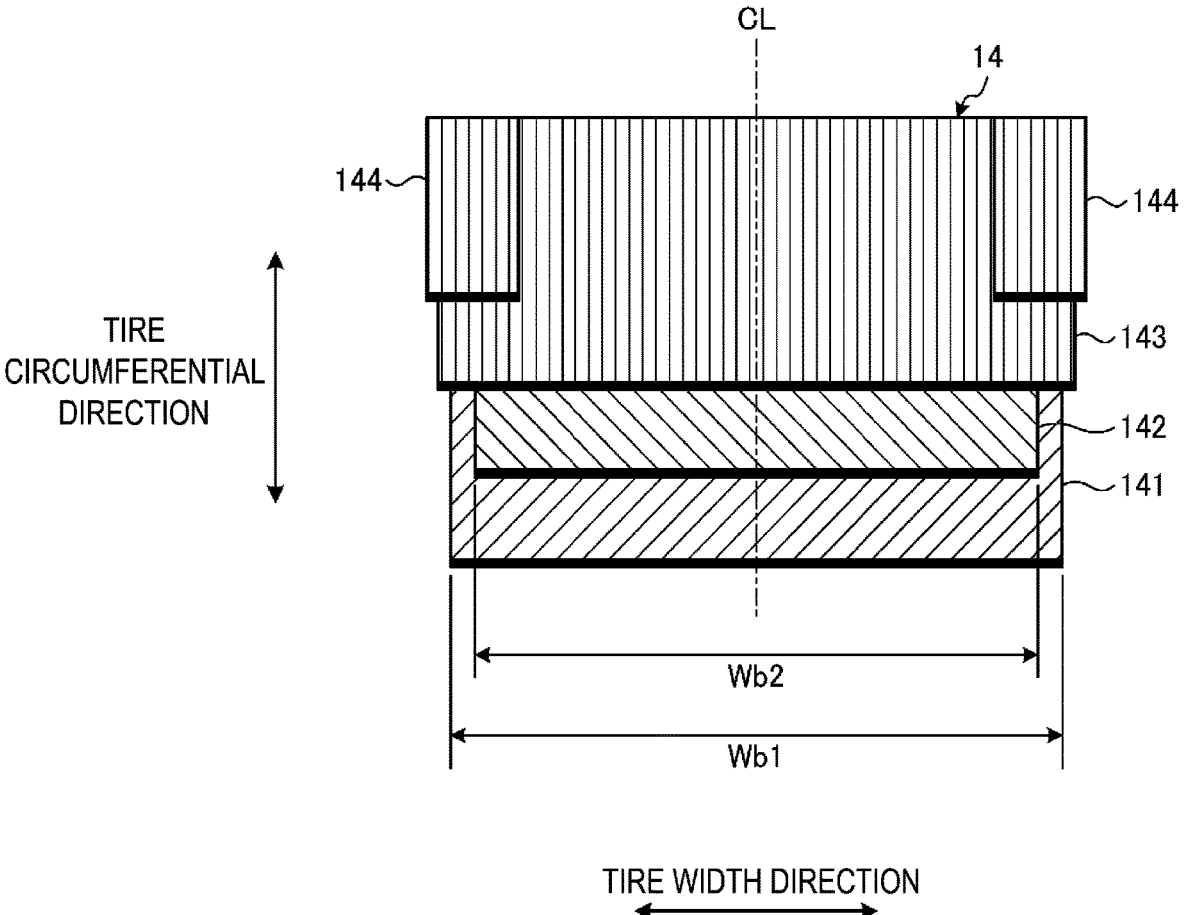
FIG. 3 is an explanatory diagram illustrating a multilayer structure of a belt layer of the tire illustrated in FIG. 1.

FIG. 3 is an explanatory diagram illustrating the multi-layer structure of the belt layer of the tire 1 illustrated in FIG. 1. In the same drawing, the thin lines given to the respective belt plies 141 to 144 schematically illustrate the arrangement configuration of the belt cords.

In the configuration of FIG. 1, as described above, the belt layer 14 is formed by layering the plurality of belt plies 141 to 144. As illustrated in FIG. 3, the belt plies 141 to 144 are constituted by the pair of cross belts 141, 142, the belt cover 143, and the pair of belt edge covers 144, 144.

At this time, the strength Tbt (N/50 mm) per the width of 50 mm of each of the pair of cross belts 141, 142 is in the range 25≤Tbt/OD≤250 and preferably in the range 30≤Tbt/OD≤230 with respect to the tire outer diameter OD (mm). The strength Tbt (N/50 mm) of the cross belts 141, 142 is in the range 45≤Tbt/SW≤500 and preferably in the range 50≤Tbt/SW≤450 with respect to the total tire width SW (mm). As a result, the respective load capacities of the pair of cross belts 141, 142 are appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the cross belt.

The strength Tbt (N/50 mm) of the belt ply is calculated as follows. In other words, a belt ply extending over the entire region of 80% of the tire ground contact width TW centered on the tire equatorial plane CL (in other words, the central portion of the tire ground contact region) is defined as an effective belt ply. The product of the strength (N/piece) per belt cord constituting the effective belt ply and the number of insertions (piece) of the belt cords per the width of 50 mm in the region of 80% of the tire ground contact width TW described above is calculated as the strength Tbt (N/50 mm) of the belt ply. The strength of the belt cord is measured by a tensile test at a temperature of 20° C. in accordance with JIS L 1017. For example, in a configuration in which one belt cord is formed by intertwining, for example, a plurality of wire strands, the strength of the intertwined one belt cord is measured, and the strength Tbt of the belt cord is calculated. In a configuration in which the belt layer 14 is formed by layering a plurality of the effective carcass belt plies (see FIG. 1), the above-described strength Tbt is defined for each of the plurality of effective carcass belt plies. For example, in the configuration of FIG. 1, the pair of cross belts 141, 142 and the belt cover 143 correspond to the effective belt plies.

For example, in the configuration of FIG. 3, the pair of cross belts 141, 142 are configured by arraying belt cords made of steel covered with a coating rubber at a cord angle (dimension symbol omitted in the drawings) of 15 degrees or more and 55 degrees or less with respect to the tire circumferential direction. The belt cords made of the steel having the cord diameter φbt (mm) in the range 0.50≤φbt≤1.80 and the number of insertions Ebt (piece/50 mm) in the range 15≤Ebt≤60 achieves the strength Tbt (N/50 mm) of the cross belts 141, 142. The cord diameter φbt (mm) and the number of insertions Ebt (piece/50 mm) are preferably in the range 0.55≤φbt≤1.60 and 17≤Ebt≤50 and more preferably in the range 0.60≤φbt≤1.30 and 20≤Ebt≤40. The belt cord is formed by intertwining a plurality of the wire strands, and the wire strand diameter φbts (mm) is in the range 0.16≤φbts≤0.43 and preferably in the range 0.21≤φbts≤0.39.

The configuration is not limited to the configuration, and the cross belts 141, 142 may be constituted by belt cords made of an organic fiber material (for example, aramid, nylon, polyester, rayon, or the like) covered with a coating rubber. In this case, the belt cord made of the organic fiber material has the cord diameter φbt (mm) in the range 0.50≤φbt≤0.90 and the number of insertions Ebt (piece/50 mm) in the range 30≤Ebt≤65, whereby the above-described strength Tbt (N/50 mm) of the cross belts 141, 142 is achieved. The belt cords made of the high-strength organic fiber material, such as nylon, aramid, and hybrid, can be employed within the scope of obviousness by one skilled in the art.

The belt layer 14 may include a supplemental belt (not illustrated). The supplemental belt may be, for example, (1) a third cross belt constituted by covering a plurality of belt cords made of steel or an organic fiber material with a coating rubber and performing a rolling process and having a cord angle of 15 degrees or more and 55 degrees or less as an absolute value, or (2) a so-called large-angle belt constituted by covering a plurality of belt cords made of steel or an organic fiber material with a coating rubber and performing a rolling process and having a cord angle of 45 degrees or more and 70 degrees or less as and preferably 54 degrees or more and 68 degrees or less as an absolute value. The supplemental belt may be disposed (a) between the pair of cross belts 141, 142 and the carcass layer 13, (b) between the pair of cross belts 141, 142, or (c) the outer side of the pair of cross belts 141, 142 in the radial direction (not illustrated). As a result, the load capacity of the belt layer 14 is improved.

Further, a total strength TTbt (N/50 mm) of the belt layer 14 is in the range 70≤TTbt/OD≤750, preferably in the range 90≤TTbt/OD≤690, more preferably in the range 110≤TTbt/OD≤690, and further preferably in the range 120≤TTbt/OD≤690 with respect to the tire outer diameter OD (mm). As a result, the load capacity of the entire belt layer 14 is ensured. Further, 0.16×P≤TTbt/OD is preferable with the use of a specified internal pressure P (kPa) of the tire.

The total strength TTbt (N/50 mm) of the belt layer 14 is calculated as the sum of the strengths Tbt (N/50 mm) of the effective belt plies (the pair of cross belts 141, 142 and the belt cover 143 in FIG. 1) described above. Therefore, the total strength TTbt (N/50 mm) of the belt layer 14 increases with an increase in the strength Tbt (N/50 mm) of each belt ply, the number of layered belt plies, and the like.

Among the pair of cross belts 141, 142 (the supplemental belt is included in the configuration including the supplemental belt described above (not illustrated)), a width Wb1 (mm) of the widest cross belt (the cross belt 141 on the radially inner side in FIG. 3) is in the range 1.00≤Wb1/Wb2≤1.40 and preferably in the range 1.10≤Wb1/Wb2≤1.35 with respect to a width Wb2 (mm) of the narrowest cross belt (the cross belt 142 on the radially outer side in FIG. 3). The width Wb2 (mm) of the narrowest cross belt is in the range 0.61≤Wb2/SW≤0.96 and preferably in the range 0.70≤Wb2/SW≤0.94 with respect to the total tire width SW (mm). The lower limit ensures the width of the belt ply, properly sets a ground contact pressure distribution of the tire ground contact region, and ensures uneven wear resistance of the tire. The upper limit reduces strain of the end portion of the belt ply during rolling of the tire and suppresses separation of a peripheral rubber of the belt ply end portion.

The width of a belt ply is the distance in the direction of the tire rotation axis between the left and right end portions of each belt ply, measured when the tire is mounted on a specified rim, inflated to a specified internal pressure, and in an unloaded state.

Among the pair of cross belts 141, 142 (the supplemental belt is included in the configuration including the supplemental belt described above (not illustrated)), the width Wb1 (mm) of the widest cross belt (the cross belt 141 on the radially inner side in FIG. 3) is in the range 0.85≤Wb1/

TW≤1.23 mm and preferably in the range 0.90≤Wb1/ TW≤1.20 with respect to the tire ground contact width TW (mm).

For example, in the configurations of FIGS. 1 to 3, the wide cross belt 141 is disposed in the innermost layer in the tire radial direction, and the narrow cross belt 142 is disposed on the outer side of the wide cross belt 141 in the radial direction. The belt cover 143 is disposed on the outer side of the wide cross belt 142 in the radial direction to entirely cover both of the pair of cross belts 141, 142. The pair of belt edge covers 144, 144 are disposed on the outer side of the belt cover 143 in the radial direction while being spaced apart from one another to cover respective left and right edge portions of the pair of cross belts 141, 142.

Tread Profile and Tread Gauge

Figure 4:
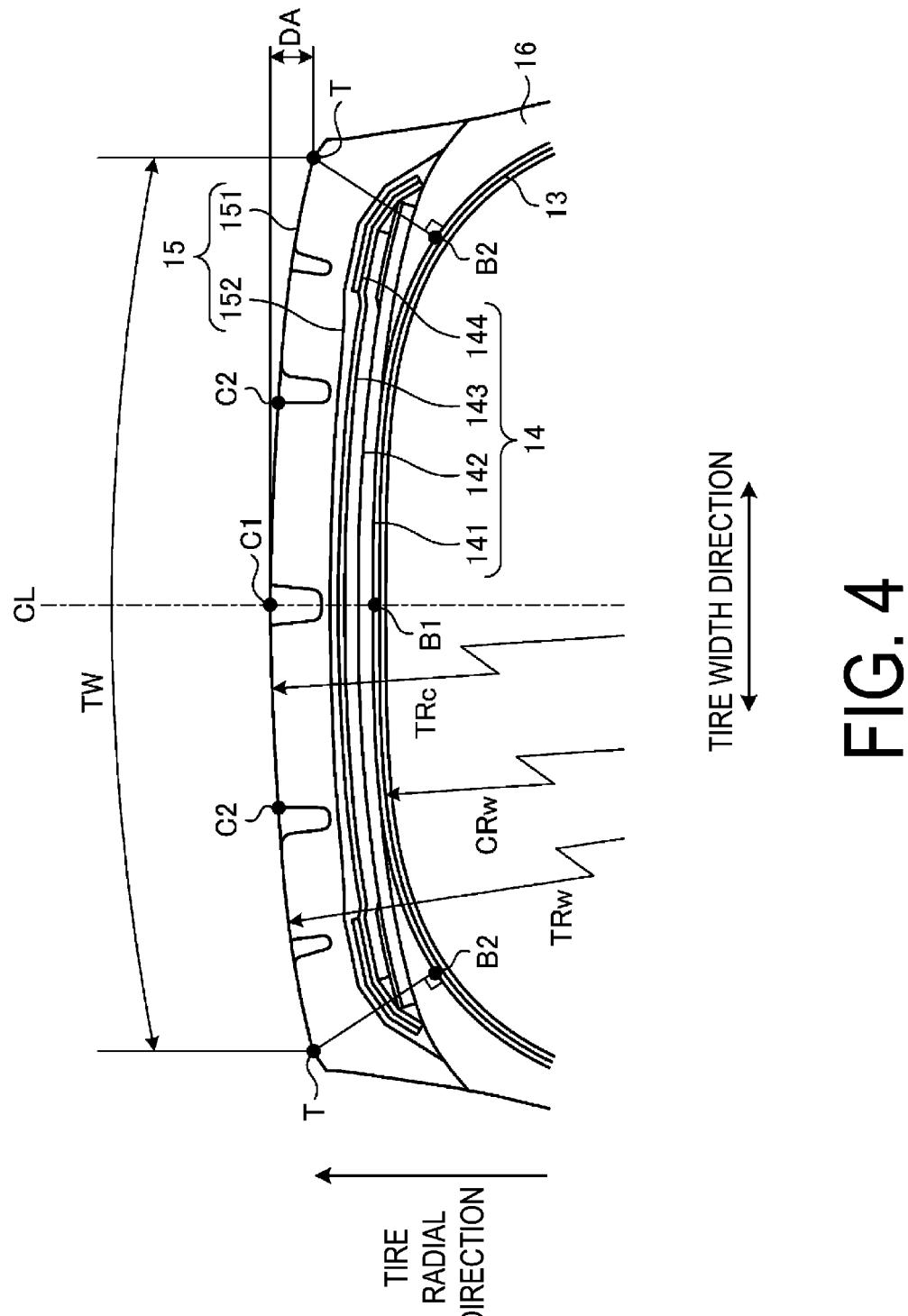
FIG. 4 is an enlarged view illustrating a tread portion of the tire illustrated in FIG. 1.

FIG. 4 is an enlarged view illustrating the tread portion of the tire 1 illustrated in FIG. 1.

In FIG. 4, an amount of depression DA (mm) of the tread profile at a tire ground contact edge T, the tire ground contact width TW (mm), and the tire outer diameter OD (mm) have the relationship 0.025≤TW/(DA×OD)≤0.400 and preferably have the relationship 0.030≤TW/(DA×OD)≤0.300. The amount of depression DA (mm) of the tread profile at the tire ground contact edge T has the relationship 0.008≤DA/ TW≤0.060 and preferably has the relationship 0.013≤DA/ TW≤0.050 with respect to the tire ground contact width TW (mm). As a result, a depression angle (defined by the ratio DA/(TW/2)) of a tread portion shoulder region is properly set and the load capacity of the tread portion is appropriately ensured. Specifically, the lower limit ensures the depression angle of the tread portion shoulder region and suppresses a decrease in wear life caused by an excessive ground contact pressure of the tread portion shoulder region. The upper limit flattens the tire ground contact region, uniforms the ground contact pressure, and ensures the wear resistance performance of the tire. In particular, since the small-diameter tire is assumed to be used under a high internal pressure and a high load, the ground contact pressure distribution in the tire ground contact region can be effectively properly set by the configuration.

The amount of depression DA is the distance in the tire radial direction from the intersection point C1 between the tire equatorial plane CL and the tread profile in the cross-sectional view in the tire meridian direction to the tire ground contact edge T, and is measured when the tire is mounted on a specified rim, inflated to a specified internal pressure, and in an unloaded state.

The tire profile is a contour line of the tire in a cross-sectional view along the tire meridian direction, and is measured using a laser profiler. The laser profiler used may be, for example, a tire profile measuring device (available from Matsuo Co., Ltd.).

The amount of depression DA (mm) of the tread profile at the tire ground contact edge T preferably satisfies the following mathematical formula (5) with respect to the tire outer diameter OD (mm) and the total tire width SW (mm). Here, Emin=3.5 and Emax=17, preferably Emin=3.8 and Emax=13, and more preferably Emin=4.0 and Emax=9.

$$Emin*(SW/OD) \wedge (1/4) \le DA \le Emax*(SW/OD) \wedge (1/4) \quad (5)$$

FIG. 4 defines the point C1 on the tread profile on the tire equatorial plane CL and a pair of points C2, C2 on the tread profile at a distance of ¼ of the tire ground contact width TW from the tire equatorial plane CL.

At this time, a radius of curvature TRc (mm) of an arc passing through the point C1 and the pair of points C2 is in the range 0.15≤TRc/OD≤15 and preferably in the range 0.18≤TRc/OD≤12 with respect to the tire outer diameter OD (mm). The radius of curvature TRc (mm) of the arc is in the range 30≤TRc≤3000, preferably in the range 50≤TRc≤2800, and more preferably in the range 80≤TRc≤2500. As a result, the load capacity of the tread portion is appropriately ensured. Specifically, the lower limit flattens the tread portion center region, uniforms the ground contact pressure of the tire ground contact region, and ensures the wear resistance performance of the tire. The upper limit suppresses a decrease in wear life caused by an excessive ground contact pressure of the tread portion shoulder region. In particular, since the small-diameter tire is assumed to be used under a high internal pressure and a high load, and thus a uniform effect of the ground contact pressure under such a use condition can be effectively obtained.

The radius of curvature of the arc is measured when the tire is mounted on a specified rim, inflated to a specified internal pressure, and in an unloaded state.

In FIG. 4, a radius of curvature TRw (mm) of an arc passing through the point C1 of the tire equatorial plane CL and the left and right tire ground contact edges T, T described above is in the range 0.30≤TRw/OD≤16 and preferably in the range 0.35≤TRw/OD≤11 with respect to the tire outer diameter OD (mm). The radius of curvature TRw (mm) of the arc is in the range 150≤TRw≤2800 and preferably in the range 200≤TRw≤2500. As a result, the load capacity of the tread portion is appropriately ensured. Specifically, the lower limit flattens the entire tire ground contact region, uniforms the ground contact pressure, and ensures the wear resistance performance of the tire. The upper limit suppresses a decrease in wear life caused by an excessive ground contact pressure of the tread portion shoulder region. In particular, since the small-diametertire is assumed to be used under a high internal pressure and a high load, the ground contact pressure distribution in the tire ground contact region can be effectively properly set by the configuration.

The radius of curvature TRw (mm) of a first arc passing through the points C1 and C2 described above is in the range 0.50≤TRw/TRc≤1.00, preferably in the range 0.60≤TRw/ TRc≤0.95, and more preferably in the range 0.70≤TRw/ TRc≤0.90 with respect to the radius of curvature TRw (mm) of a second arc passing through the point C1 and the tire ground contact edge T. This sets a contact patch shape of the tire appropriate. Specifically, the lower limit disperses the ground contact pressure of the tread portion center region and improves the wear life of the tire. The upper limit suppresses a decrease in wear life caused by an excessive ground contact pressure of the tread portion shoulder region.

In FIG. 4, a point B1 on the carcass layer 13 on the tire equatorial plane CL and feet B2, B2 of perpendicular lines extending from the left and right tire ground contact edges T, T to the carcass layer 13 are defined.

At this time, a radius of curvature CRw of an arc passing through the point B1 and the pair of points B2 and B2 is in the range 0.35≤CRw/TRw≤1.10, preferably in the range 0.40≤CRw/TRw≤1.00, and more preferably in the range 0.45≤CRw/TRw≤0.92 with respect to the radius of curvature TRw of the arc passing through the point C1 and the tire ground contact edges T and T described above. The radius of curvature CRw (mm) is in the range 100≤CRw≤2500 and preferably in the range 120≤CRw≤2200. This sets the contact patch shape of the tire more appropriate. Specifically, the lower limit suppresses a decrease in wear life caused by an increase in rubber gauge in the tread portion shoulder region. The upper limit ensures the wear life in the tread portion center region.

Figure 5:
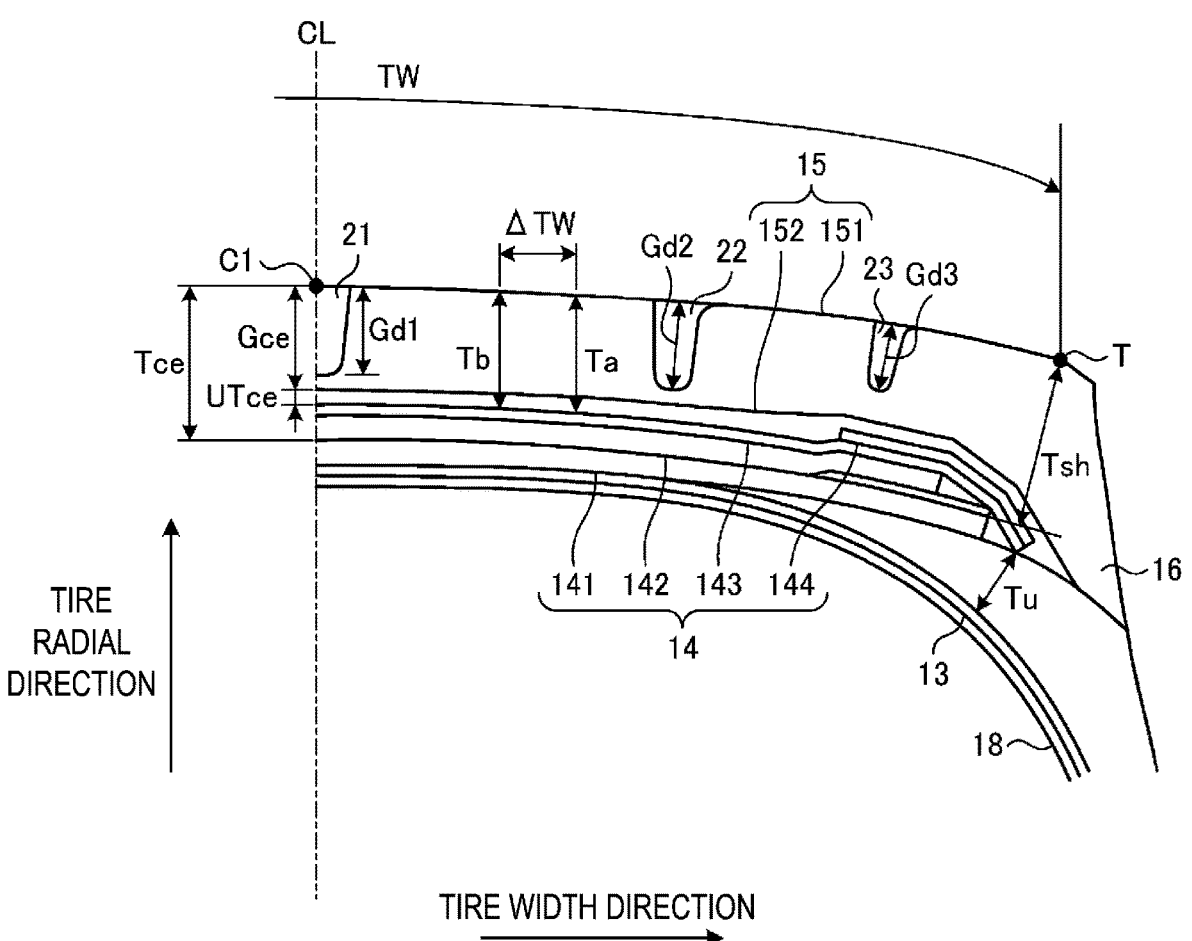
FIG. 5 is an enlarged view illustrating a half region of the tread portion illustrated in FIG. 4.

FIG. 5 is an enlarged view illustrating the half region of the tread portion illustrated in FIG. 4.

In the configuration of FIG. 1, as described above, the belt layer 14 includes the pair of cross belts 141, 142 and the tread rubber 15 includes the cap tread 151 and the undertread 152.

In FIG. 5, a distance Tce (mm) from the tread profile on the tire equatorial plane CL to the outer circumferential surface of the wide cross belt 141 has the relationship 0.008≤Tce/OD≤0.13, preferably has the relationship 0.012≤Tce/OD≤0.10, and more preferably has the relationship 0.015≤Tce/OD≤0.07 with respect to the tire outer diameter OD (mm). A distance Tce (mm) is in the range 5≤Tce≤25 and preferably in the range 7≤Tce≤20. As a result, the load capacity of the tread portion is appropriately ensured. Specifically, the lower limit suppresses tire deformation during use under a high load and ensures the wear resistance performance of the tire. In particular, since the small-diameter tire is assumed to be used under a high internal pressure and a high load, the above-described wear resistance performance is significantly obtained. The upper limit suppresses the deterioration of the rolling resistance caused by the increase in the weight of the tread rubber.

The distance Tce is measured when the tire is mounted on a specified rim, inflated to a specified internal pressure, and in an unloaded state.

The outer circumferential surface of the belt ply is defined as a circumferential surface on the outer side in the radial direction of the entire belt ply formed of the belt cords and the coating rubber.

The distance Tce (mm) from the tread profile on the tire equatorial plane CL to the outer circumferential surface of the wide cross belt 141 preferably satisfies the following mathematical formula (6) with respect to the tire outer diameter OD (mm). Here, Fmin=35 and Fmax=207 and preferably Fmin=42 and Fmax=202.

$$Fmin/(OD) \wedge (1/3) \le Tce \le Fmax/(OD) \wedge (1/3) \qquad (6)$$

A distance Tsh (mm) from the tread profile at the tire ground contact edge T to the outer circumferential surface of the wide cross belt 141 is in the range 0.60≤Tsh/Tce≤1.70, preferably in the range 1.01≤Tsh/Tce≤1.55, and more preferably in the range 1.10≤Tsh/Tce≤1.50 with respect to the distance Tce (mm) in the tire equatorial plane CL. The lower limit ensures the tread gauge in the shoulder region, and therefore repeated deformation of the tire during rolling of the tire is suppressed, and the wear resistance performance of the tire is ensured. The upper limit ensures the tread gauge in the center region, and therefore the tire deformation during use under a high load peculiar to the small-diameter tire is suppressed, and the wear resistance performance of the tire is ensured.

The distance Tsh is measured when the tire is mounted on a specified rim, inflated to a specified internal pressure, and in an unloaded state. When a wide cross belt is not present immediately below the tire ground contact edge T, the distance is measured as a distance of an imaginary line of the distance Tsh extending from the outer circumferential surface of the belt ply from the tread profile.

The distance Tsh (mm) from the tread profile to the outer circumferential surface of the wide cross belt 141 in the tire ground contact edge T preferably satisfies the following mathematical formula (7) with respect to the distance Tce (mm) in the tire equatorial plane CL. Here, Gmin=0.36 and Gmax=0.72, preferably Gmin=0.37 and Gmax=0.71, and more preferably Gmin=0.38 and Gmax=0.70.

$$Gmin*(OD) \wedge (1/7) \le Tsh/Tce \le Gmax*(OD) \wedge (1/7) \qquad (7)$$

In FIG. 5, a section having a width ATW of 10% of the tire ground contact width TW is defined. At this time, a ratio between a maximum value Ta and a minimum value Tb of the rubber gauge of the tread rubber 15 in any section in the tire ground contact region is in the range of 0% or more to 40% or less and preferably in the range 0% or more to 20% or less. In such a configuration, since an amount of change in the rubber gauge of the tread rubber 15 in any section in the tire ground contact region (in particular, a section including the end portions of the belt plies 141 to 144) is set to be small, the ground contact pressure distribution in the tire width direction smoothens and the wear resistance performance of the tire is improved.

The rubber gauge of the tread rubber 15 is defined as a distance from the tread profile to the inner circumferential surface of the tread rubber 15 (in FIG. 5, a distance from the outer circumferential surface of the cap tread 151 to the inner circumferential surface of the undertread 152). Therefore, the rubber gauge of the tread rubber 15 is measured with a groove formed in a tread contact surface excluded.

In FIG. 5, a rubber gauge UTce of the undertread 152 at the tire equatorial plane CL is in the range 0.04≤UTce/Tce≤0.60 and preferably in the range 0.06≤UTce/Tce≤0.50 with respect to the distance Tce in the tire equatorial plane CL described above. Thus, the rubber gauge UTce of the undertread 152 is properly set.

The above-described distance Tsh in the tire ground contact edge T is in the range 1.50≤Tsh/Tu≤6.90 and preferably in the range 2.00≤Tsh/Tu≤6.50 with respect to a rubber gauge Tu (mm) from the end portion of the wide cross belt 141 to the outer circumferential surface of the carcass layer 13. As a result, the profile of the carcass layer 13 is properly set and tension of the carcass layer 13 is properly set. Specifically, the lower limit ensures the tension of the carcass layer and the tread gauge in the shoulder region, and therefore repeated deformation of the tire during rolling of the tire is suppressed, and the wear resistance performance of the tire is ensured. The upper limit ensures the rubber gauge at or near the end portion of the belt ply, and therefore separation of the peripheral rubber of the belt ply is suppressed.

The rubber gauge Tu is substantially measured as a gauge of a rubber member (the sidewall rubber 16 in FIG. 5) inserted between the end portion of the wide cross belt 141 and the carcass layer 13.

The outer circumferential surface of the carcass layer 13 is defined as a circumferential surface on the outer side in the radial direction of the entire carcass ply formed of the carcass cords and the coating rubber. When the carcass layer 13 has a multilayer structure formed of a plurality of carcass plies (not illustrated), the outer circumferential surface of the carcass ply of the outermost layer constitutes the outer circumferential surface of the carcass layer 13. When the turned-up portion 132 (see FIG. 1) of the carcass layer 13 is present between the end portion of the wide cross belt 141 and the carcass layer 13 (not illustrated), the outer circumferential surface of the turned-up portion 132 constitutes the outer circumferential surface of the carcass layer 13.

For example, in the configuration of FIG. 5, the sidewall rubber 16 is inserted between the end portion of the wide cross belt 141 and the carcass layer 13 to form the rubber gauge Tu between the end portion of the wide cross belt 141 and the carcass layer 13. However, the configuration is not limited to this, and, for example, a belt cushion may be inserted between the end portion of the wide cross belt 141 and the carcass layer 13 instead of the sidewall rubber 16 (not illustrated). The inserted rubber member has a rubber hardness Hs_sp of 46 or more and 67 or less, a modulus M_sp (MPa) at 100% elongation of 1.0 or more and 3.5 or less, and a loss tangent tan δ_sp of 0.02 or more and 0.22 or less and preferably has the rubber hardness Hs_sp of 48 or more and 63 or less, the modulus M_sp (MPa) at 100% elongation of 1.2 or more and 3.2 or less, and a loss tangent tan δ_sp of 0.04 or more and 0.20 or less.

In the configuration of FIG. 1, the tire 1 includes, in a tread surface: a plurality of circumferential main grooves 21 to 23 extending in the tire circumferential direction (see FIG. 5) and land portions (reference sign omitted in drawings) defined by the circumferential main grooves 21 to 23. "Main groove" refers to a groove having a wear indicator as specified by JATMA mandatorily provided.

At this time, as illustrated in FIG. 5, a groove depth Gd1 (mm) of the circumferential main groove 21 closest to the tire equatorial plane CL among the plurality of circumferential main grooves 21 to 23 is in the range 0.50≤Gd1/Gce≤1.00 and preferably in the range 0.55≤Gd1/Gce≤0.98 with respect to a rubber gauge Gce (mm) of the tread rubber 15. Thus, the wear resistance performance of the tire is ensured. Specifically, the lower limit disperses the ground contact pressure of the tread portion center region and improves the wear life of the tire. The upper limit ensures the rigidity of the land portion and ensures the rubber gauge from the groove bottom of the circumferential main groove 21 to the belt layer.

The circumferential main groove closest to the tire equatorial plane CL is defined as the circumferential main groove 21 (see FIG. 5) on the tire equatorial plane CL. When a circumferential main groove is absent on the tire equatorial plane CL (not illustrated), the circumferential main groove is defined as the circumferential main groove closest to the tire equatorial plane CL.

The ratio Gd1/Gce described above preferably satisfies the following mathematical formula (8) with respect to the tire outer diameter OD (mm). Here, Hmin=0.10 and Hmax=0.60, preferably Hmin=0.12 and Hmax=0.50, and more preferably Hmin=0.14 and Hmax=0.40.

$$Hmin * 250/OD \leq Gd1/Gce \leq Hmax + 250/OD \quad (8)$$

A groove depth Gd1 (mm) of the circumferential main groove 21 closest to the tire equatorial plane CL among the plurality of circumferential main grooves 21 to 23 is deeper than groove depths Gd2 (mm), Gd3 (mm) of the other circumferential main grooves 22, 23 (Gd2<Gd1, Gd3<Gd1). Specifically, when a region from the tire equatorial plane CL to the tire ground contact edge T is bisected in the tire width direction, the groove depth Gd1 of the circumferential main groove (reference sign omitted in drawings) closest to the tire equatorial plane CL is in the range of 1.00 times or more and 2.50 times or less, preferably in the range of 1.00 times or more and 2.00 times or less, and more preferably in the range of 1.00 times or more and 1.80 times or less with respect to the maximum values of the groove depths Gd2, Gd3 of the other circumferential main grooves (reference sign omitted in drawings) in the region on the tire ground contact edge T side. The lower limit disperses the ground contact pressure of the tread portion center region and improves the wear resistance performance of the tire. The upper limit suppresses uneven wear caused by the excessive ground contact pressure difference between the tread portion center region and the shoulder region.

Side Profile and Side Gauge

Figure 6:
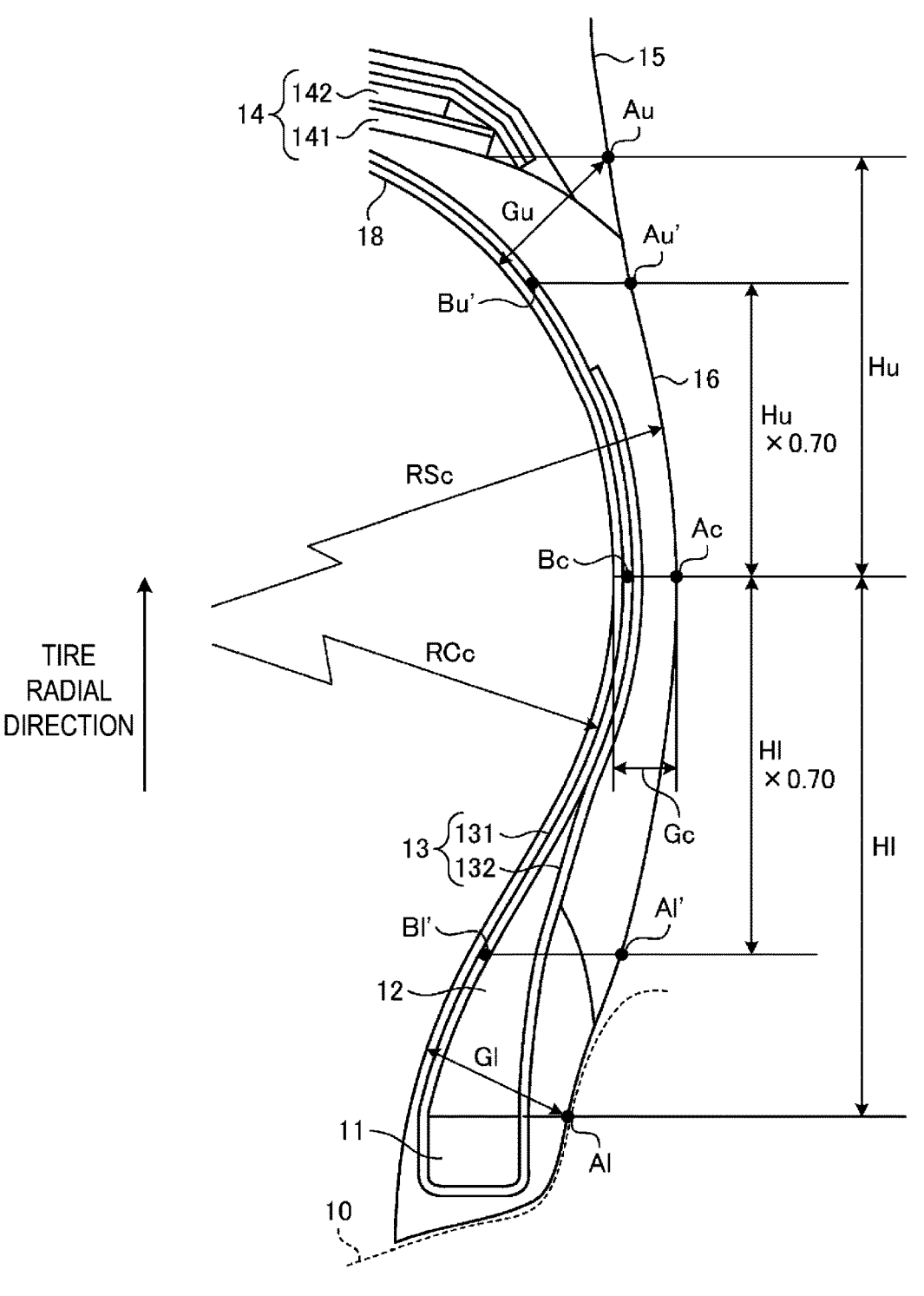
FIG. 6 is an enlarged view illustrating a sidewall portion and a bead portion of the tire illustrated in FIG. 1.
Figure 7:
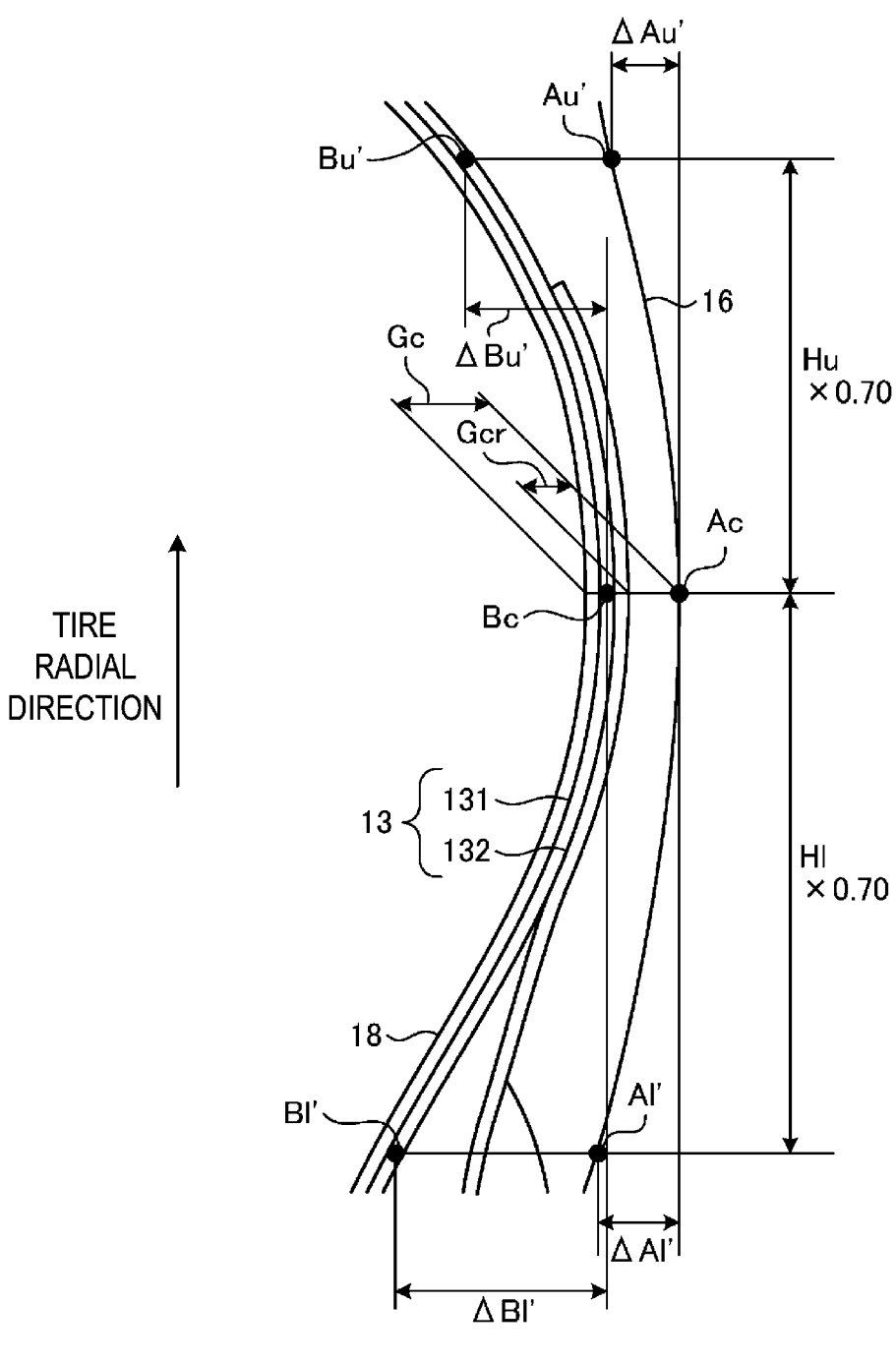
FIG. 7 is an enlarged view illustrating the sidewall portion illustrated in FIG. 6.

FIG. 6 is an enlarged view illustrating the sidewall portion and the bead portion of the tire 1 illustrated in FIG. 1. FIG. 7 is an enlarged view illustrating the sidewall portion illustrated in FIG. 6.

In FIG. 6, the point Au on the side profile at the same position as the end portion of the innermost layer of the belt layer 14 (in FIG. 6, the cross belt 141 on the radially inner side) in the tire radial direction and a point Al on the side profile at the same position as the end portion on the outer side in the radial direction of the bead core 11 in the tire radial direction are defined. The distance Hu from the tire maximum width position Ac to the point Au in the tire radial direction and a distance Hl from the tire maximum width position Ac to the point Al in the tire radial direction are defined. The point Au' on the side profile at a radial position of 70% of the distance Hu from the tire maximum width position Ac and a point Al' on the side profile at a radial position of 70% of the distance Hl from the tire maximum width position Ac are defined.

At this time, the sum of the distance Hu (mm) and the distance Hl (mm) is in the range 0.45≤(Hu+Hl)/SH≤0.90 and preferably in the range 0.50≤(Hu+Hl)/SH≤0.85 with respect to the tire cross-sectional height SH (mm) (see FIG. 2). In this way, the redial distance from the belt layer 14 to the bead core 11 is appropriately set. Specifically, the lower limit ensures a deformable region of the tire side portion and suppresses a failure of the tire side portion (for example, separation of the rubber member at the end portion on the outer side of the bead filler 12 in the radial direction). The upper limit reduces the amount of deflection of the tire side portion during rolling of the tire and reduces the rolling resistance of the tire.

The distance Hu and the distance Hl are measured when the tire is mounted on a specified rim, inflated to a specified internal pressure, and in an unloaded state.

The sum of the distance Hu (mm) and the distance Hl (mm) preferably satisfies the following mathematical formula (9) with respect to tire outer diameter OD (FIG. 1), the tire cross-sectional height SH (mm) (see FIG. 2), and a radius of curvature RSc (mm) of an arc passing through the tire maximum width position Ac, the point Au', and the point Al'. Here, I1min=0.06, I1max=0.20, and I2=0.70 and preferably I1min=0.09, I1max=0.20, and I2=0.65.

$$I1min * (OD/RSc) \wedge (1/2) \leq \quad (9)$$
$$(Hu + Hl)/SH \leq I2 + I1max * (RSc/OD) \wedge (1/2)$$

The radius of curvature RSc of the arc is measured when the tire is mounted on a specified rim, inflated to a specified internal pressure, and in an unloaded state.

The distance Hu (mm) and the distance Hl (mm) have the relationship 0.30≤Hu/(Hu+Hl)≤0.70 and preferably have the relationship 0.35≤Hu/(Hu+Hl)≤0.65. Accordingly, the position of the tire maximum width position Ac in the deformable region of the tire side portion is properly set. Specifically, the lower limit alleviates stress concentration at or near the end portion of the belt ply caused by the tire maximum width position Ac being excessively close to the end portion of the belt layer 14 and suppresses the separation of the peripheral rubber. The upper limit alleviates stress concentration at or near the bead portion caused by the tire maximum width position Ac being excessively close to the end portion of the bead core 11 and suppresses a failure of a reinforcing member (the bead filler 12 in FIG. 6) of the bead portion.

The radius of curvature RSc (mm) of the arc passing through the tire maximum width position Ac, the point Au', and the point Al' is in the range 0.05≤RSc/OD≤1.70 and preferably in the range 0.10≤RSc/OD≤1.60 with respect to the tire outer diameter OD (mm). The radius of curvature RSc (mm) of the arc is in the range 25≤RSc≤330 and preferably in the range 30≤RSc≤300. As a result, the radius of curvature of the side profile is properly set and the load capacity of the tire side portion is appropriately ensured. Specifically, the lower limit reduces the amount of deflection of the tire side portion during rolling of the tire and reduces the rolling resistance of the tire. The upper limit suppresses stress concentration caused by the tire side portion becoming flat and improves durability performance of the tire. In particular, in the small-diameter tire, since large stress tends to act on the tire side portion due to the use under the high internal pressure and the high load described above, there is also a problem that side cut resistance performance of the tire should be ensured. In this regard, the lower limit ensures the radius of curvature of the side profile, suppresses a collapse of the tire by carcass tension being properly set, and suppresses side cut of the tire. The upper limit suppresses the side cut of the tire caused by an excessive tension of the carcass layer 13.

The radius of curvature RSc (mm) of the arc is in the range 0.50≤RSc/SH≤0.95 and preferably in the range 0.55≤RSc/SH≤0.90 with respect to the tire cross-sectional height SH (mm).

The radius of curvature RSc (mm) of the arc preferably satisfies the following mathematical formula (10) with respect to the tire outer diameter OD (mm) and the rim diameter RD (mm). Here, Jmin=15 and Jmax=360, preferably Jmin=20 and Jmax=330, and more preferably Jmin=25 and Jmax=300.

$$Jmin*(OD/RD)\wedge(1/2) \le RSc \le Jmax+(OD/D)\wedge(1/2) \qquad (10)$$

In FIG. 6, a point Bc on the body portion 131 of the carcass layer 13 at the same position as the tire maximum width position Ac in the tire radial direction is defined. A point Bu' on the body portion 131 of the carcass layer 13 at a radial position of 70% of the above-described distance Hu from the tire maximum width position Ac is defined. A point Bl' on the body portion 131 of the carcass layer 13 at a radial position of 70% of the above-described distance Hl from the tire maximum width position Ac is defined.

At this time, the radius of curvature RSc (mm) of the arc passing through the tire maximum width position Ac, the point Au' and the point l' described above is in the range 1.10≤RSc/RcC≤4.00 and preferably in the range 1.50≤RSc/RcC≤3.50 with respect to the radius of curvature RcC (mm) of the arc passing through the point Bc, the point Bu' and the point Bl'. The radius of curvature RcC (mm) of the arc passing through the point Bc, the point Bu' and the point Bl' is in the range 5≤RcC≤300 and preferably in the range 10≤RcC≤270. Thus, the relationship between the radius of curvature RSc of the side profile of the tire and the radius of curvature RcC of the side profile of the carcass layer 13 is properly set. Specifically, the lower limit ensures the radius of curvature RcC of the carcass profile, ensures the internal volume V of the tire described later, and ensures the load capacity of the tire. The upper limit ensures the total gauges Gu and Gl of the tire side portion described later and ensures the load capacity of the tire side portion.

The radius of curvature RSc (mm) of the side profile described above preferably satisfies the following mathematical formula (11) with respect to the radius of curvature RcC (mm) of the carcass profile and the tire outer diameter OD (mm). Here, Kmin=1 and Kmax=130, preferably Kmin=2 and Kmax=100, and more preferably Kmin=3 and Kmax=70.

$$Kmin*(OD/RSc)\wedge(1/2) \le RCc \le Kmax*(OD/RSc)\wedge(1/2) \qquad (11)$$

In FIG. 6, the total gauge Gu (mm) of the tire side portion at the above-described point Au is in the range 0.010≤Gu/OD≤0.080 and preferably in the range 0.017≤Gu/OD≤0.070 with respect to the tire outer diameter OD (mm). Accordingly, the total gauge Gu in the region on the outer side of the tire side portion in the radial direction is properly set. Specifically, the lower limit ensures the total gauge Gu in the region on the outer side of the tire side portion in the radial direction, suppresses the tire deformation during use under a high load, and ensures the wear resistance performance of the tire. In particular, since the small-diameter tire is assumed to be used under a high internal pressure and a high load, the above-described reduction effect of the rolling resistance of the tire is significantly obtained. The upper limit suppresses the deterioration of the rolling resistance of the tire caused by the total gauge Gu being excessive.

The total gauge of the tire side portion is measured as a distance from the side profile to the tire inner surface on a perpendicular line drawn from a predetermined point on the side profile to the body portion 131 of the carcass layer 13.

In FIG. 6, the total gauge Gu (mm) at the above-described point Au is in the range 1.30≤Gu/Gc≤5.00 and preferably the ratio Gu/Gc is in the range 1.90≤Gu/Gc≤3.00 with respect to the total gauge Gc (mm) of the tire side portion at the tire maximum width position Ac. Accordingly, the gauge distribution of the tire side portion from the tire maximum width position Ac to the innermost layer of the belt layer 14 is properly set. Specifically, the lower limit ensures the total gauge Gu in the region on the outer side in the radial direction, suppresses the tire deformation during use under a high load, and ensures the wear resistance performance of the tire. The upper limit suppresses the deterioration of the rolling resistance of the tire caused by the total gauge Gu being excessive.

The total gauge Gu (mm) at the above-described point Au preferably satisfies the following mathematical formula (12) with respect to the total gauge Gc (mm) at the tire maximum width position Ac and the tire outer diameter OD (mm). Here, Lmin=0.10 and Lmax=0.70, preferably Lmin=0.14 and Lmax=0.70, and more preferably Lmin=0.19 and Lmax=0.70.

$$Lmin*(OD)\wedge(1/3)*Gc \le Gu \le Lmax*(OD)\wedge(1/3)*Gc \qquad (12)$$

In FIG. 6, the total gauge Gc (mm) of the tire side portion at the tire maximum width position Ac has the relationship 0.003≤Gc/OD≤0.060 with respect to the tire outer diameter OD (mm) and preferably has the relationship 0.004≤Gc/OD≤0.050. The lower limit ensures the total gauge Gc at the tire maximum width position Ac and ensures the load capacity of the tire. The upper limit ensures the reduction effect of the rolling resistance of the tire by reducing the total gauge Gc at the tire maximum width position Ac.

The total gauge Gc (mm) at the tire maximum width position Ac preferably satisfies the following mathematical formula (13) with respect to the tire outer diameter OD (mm). Here, Mmin=70 and Mmax=450 and preferably Mmin=80 and Mmax=400.

$$Mmin/(OD) \wedge (1/2) \le Gc \le Mmax/(OD) \wedge (1/2) \qquad (13)$$

The total gauge Gc (mm) at the tire maximum width position Ac preferably satisfies the following mathematical formula (14) with respect to the tire outer diameter OD (mm) and the total tire width SW (mm). Here, Nmin=0.20 and Nmax=15, preferably Nmin=0.40 and Nmax=15, and more preferably Nmin=0.60 and Nmax=12.

$$Nmin * (OD/SW) \le Gc \le Nmax * (OD/SW) \qquad (14)$$

The total gauge Gc (mm) at the tire maximum width position Ac preferably satisfies the following mathematical formula (15) with respect to the radius of curvature RSc (mm) of the arc passing through the tire maximum width position Ac, the point Au', and the point Al' described above. Here, Omin=13 and Omax=260 and preferably Omin=20 and Omax=200.

$$Omin/(RSc) \wedge (1/2) \le Gc \le Omax/(RSc) \wedge (1/2) \qquad (15)$$

In FIG. 6, the total gauge Gl (mm) of the tire side portion at the above-described point Al is in the range 0.010≤Gl/OD≤0.150 and preferably in the range 0.015≤Gl/OD≤0.100 with respect to the tire outer diameter OD. Accordingly, the total gauge Gl in the region on the inner side of the tire side portion in the radial direction is properly set. Specifically, the lower limit ensures the total gauge Gl in the region on the inner side of the tire side portion in the radial direction, suppresses the tire deformation during use under a high load, and ensures the wear resistance performance of the tire. In particular, since the small-diameter tire is assumed to be used under a high internal pressure and a high load, the above-described reduction effect of the rolling resistance of the tire is significantly obtained. The upper limit suppresses the deterioration of the rolling resistance of the tire caused by the total gauge Gl being excessive.

In FIG. 6, the ratio Gl/Gc of the total gauge Gl (mm) of the tire side portion at the point Al to the total gauge Gc (mm) of the tire side portion at the tire maximum width position Ac is in the range 1.00≤Gl/Gc≤7.00 and preferably the ratio Gu/Gc is in the range 2.00≤Gl/Gc≤5.00. Accordingly, the gauge distribution of the tire side portion from the tire maximum width position Ac to the bead core 11 is properly set. Specifically, the lower limit ensures the total gauge Gu in the region on the inner side in the radial direction, suppresses the tire deformation during use under a high load, and ensures the wear resistance performance of the tire. The upper limit suppresses the deterioration of the rolling resistance of the tire caused by the total gauge Gl being excessive.

The total gauge Gl (mm) of the tire side portion at the above-described point Al preferably satisfies the following mathematical formula (16) with respect to the total gauge Gc (mm) at the tire maximum width position Ac and the tire outer diameter OD (mm). Here, Pmin=0.12 and Pmax=1.00, preferably Pmin=0.15 and Pmax=1.00, and more preferably Pmin=0.18 and Pmax=1.00.

$$Pmin * (OD) \wedge (1/3) * Gc \le Gl \le Pmax * (OD) \wedge (1/3) * Gc \qquad (16)$$

In FIG. 6, the total gauge Gl (mm) at the point Al described above is in the range 0.80≤Gl/Gu≤5.00 and preferably in the range 1.00≤Gl/Gu≤4.00 with respect to the total gauge Gu (mm) at the point Au described above. Accordingly, the ratio between the total gauge Gl in the region on the outer side in the radial direction and the total gauge Gu in the region on the inner side in the radial direction of the tire side portion is properly set.

The total gauge Gl (mm) at the above-described point Al preferably satisfies the following mathematical formula (17) with respect to the total gauge Gu (mm) at the above-described point Au and the tire outer diameter OD (mm). Here, Qmin=0.09 and Qmax=0.80, preferably Qmin=0.10 and Qmax=0.70, and more preferably Qmin=0.11 and Qmax=0.50.

$$Qmin * (OD) \wedge (1/3) * Gu \le Gl \le Qmax * (OD) \wedge (1/3) * Gu \qquad (17)$$

In FIG. 6, an average rubber hardness Hsc at the measurement position of the total gauge Gc, an average rubber hardness Hsu at the measurement position of the total gauge Gu, and an average rubber hardness Hsl at the measurement point position of the total gauge Gl have the relationship Hsc≤Hsu<Hsl, preferably have the relationship 1≤Hsu−Hsc≤18 and 2≤Hsl−Hsu≤27, and more preferably have the relationship 2≤Hsu−Hsc≤15 and 5≤Hsl−Hsu≤23. Accordingly, the relationship between the rubber hardnesses of the side portion is properly set.

The average rubber hardnesses Hsc, Hsu, Hsl are calculated as the sum of values obtained by dividing the product of the cross-sectional lengths and the rubber hardnesses of the respective rubber members at the respective measurement points of the total gauge Gc (mm) at the tire maximum width position Ac, the total gauge Gu at the point Au, and the total gauge Gl at the point Al by the total gauge.

In FIG. 7, a distance ΔAu' (mm) from the tire maximum width position Ac to the point Au' in the tire widthwise direction is in the range 0.03≤ΔAu'/(Hu×0.70)≤0.23 and preferably in the range 0.07≤ΔAu'/(Hu×0.70)≤0.17 with respect to 70% of the distance Hu (mm) from the tire maximum width position Ac described above. Thus, a degree of curvature of the side profile in the region on the outer side in the radial direction is properly set. Specifically, the lower limit suppresses stress concentration caused by the flat tire side portion and improves the durability performance of the tire. The upper limit reduces the amount of deflection of the tire side portion during rolling of the tire and reduces the rolling resistance of the tire. In particular, in the small-diameter tire, since large stress tends to act on the tire side portion due to the use under the high internal pressure and the high load described above, there is also a problem that side cut resistance performance of the tire should be ensured. In this regard, the lower limit ensures the radius of curvature of the side profile, suppresses a collapse of the tire by carcass tension being properly set, and suppresses side cut of the tire. The upper limit suppresses the side cut of the tire caused by an excessive tension of the carcass layer 13.

The distance ΔAl' (mm) from the tire maximum width position Ac to the point Al' in the tire width direction is in the range 0.03≤ΔAl'/(Hl×0.70)≤0.28 and preferably in the range 0.07≤ΔAl'/(Hl×0.70)≤0.20 with respect to 70% of the distance Hl (mm) from the tire maximum width position Ac. Thus, the degree of curvature of the side profile in the region on the inner side in the radial direction is properly set. Specifically, the lower limit suppresses stress concentration caused by the flat tire side portion and improves the durability performance of the tire. In particular, in the small-diameter tire, since the bead core 11 is reinforced as described above, the stress concentration at and near the bead core 11 is effectively suppressed. The upper limit reduces the amount of deflection of the tire side portion during rolling of the tire and reduces the rolling resistance of the tire.

The distances ΔAu' and ΔAl' are measured when the tire is mounted on a specified rim, inflated to a specified internal pressure, and in an unloaded state.

The distance ΔAu' (mm) from the tire maximum width position Ac to the point Au' in the tire width direction preferably satisfies the following mathematical formula (18) with respect to the radius of curvature RSc (mm) of the arc passing through the tire maximum width position Ac, the point Au', and the point Al' described above. Here, Rmin=0.05 and Rmax=5.00 and preferably Rmin=0.10 and Rmax=4.50.

$$Rmin*(RSc) \wedge (1/2) \leq \Delta Au' \leq Rmax*(RSc) \wedge (1/2) \quad (18)$$

In FIG. 7, a distance ΔBu' (mm) from the point Bc to the point Bu' in the tire width direction is in the range 1.10≤ΔBu'/ΔAu'≤8.00 and preferably in the range 1.60≤ΔBu'/ΔAu'≤7.50 with respect to the distance ΔAu' (mm) from the tire maximum width position to the point Au' in the tire width direction. Thus, the relationship between the degree of curvature of the side profile and the degree of curvature of the carcass profile in the region on the outer side in the radial direction is properly set. Specifically, the lower limit ensures the cut resistance performance of the tire side portion. The upper limit ensures the tension of the carcass layer 13, ensures the rigidity of the tire side portion, and ensures the load capacity and the durability performance of the tire.

In FIG. 7, a distance ΔBl' (mm) from the point Bc to the point Bl' in the tire width direction is in the range 1.80≤ΔBl'/ΔAl'≤11.0 and preferably in the range 2.30≤ΔBl'/ΔAl'≤9.50 with respect to the distance ΔAl' (mm) from the tire maximum width position Ac to the point Al' in the tire width direction. Thus, the relationship between the degree of curvature of the side profile and the degree of curvature of the carcass profile in the region on the inner side in the radial direction is properly set. Specifically, the lower limit ensures the total gauge Gl of the tire side portion and ensures the load capacity of the tire side portion. The upper limit ensures the tension of the carcass layer 13, ensures the rigidity of the tire side portion, and ensures the load capacity and the durability performance of the tire.

The distances ΔBu', ΔBl' are measured when the tire is mounted on a specified rim, inflated to a specified internal pressure, and in an unloaded state. The distance ΔBu' (mm) from the point Bc to the point Bu' in the tire width direction preferably satisfies the following mathematical formula (19) with respect to the radius of curvature RcC (mm) of the arc passing through the point Bc, the point Bu', and the point Bl' described above. Here, Smin=0.40 and Smax=7.0 and preferably Smin=0.50 and Smax=6.0.

$$Smin*(RSc) \wedge (1/2) \leq \Delta Bu' \leq Smax*(RSc) \wedge (1/2) \quad (19)$$

In FIG. 7, a rubber gauge Gcr (mm) of the sidewall rubber 16 at the tire maximum width position Ac is in the range 0.40≤Gcr/Gc≤0.90 with respect to the total gauge Gc (mm) at the tire maximum width position Ac described above. The rubber gauge Gcr (mm) of the sidewall rubber 16 is in the range 1.5≤Gcr and preferably in the range 2.5≤Gcr. The lower limit ensures the rubber gauge Gcr (mm) of the sidewall rubber 16 and ensures the load capacity of the sidewall portion.

The rubber gauge Gcr (mm) of the sidewall rubber 16 at the tire maximum width position Ac preferably satisfies the following mathematical formula (20) with respect to the total gauge Gc (mm) at the tire maximum width position Ac and the tire outer diameter OD (mm) described above. Here, Tmin=80 and Tmax=0.90 and preferably Tmin=120 and Tmax=0.90.

$$Gc*(Tmin/OD) \leq Gcr \leq Gc*Tmax \quad (20)$$

In FIG. 7, a rubber gauge Gin (mm) (not illustrated) of the inner liner 18 at the tire maximum width position Ac is in the range 0.03≤Gin/Gc≤0.50 and preferably in the range 0.05≤Gin/Gc≤0.40 with respect to the total gauge Gc (mm) at the tire maximum width position Ac. As a result, the inner surface of the carcass layer 13 is appropriately protected.

Effect

As described above, the tire 1 includes the pair of bead cores 11, 11, the carcass layer 13 extended across the pair of bead cores 11, 11, and the belt layer 14 disposed on the outer side of the carcass layer 13 in the radial direction (see FIG. 1). The tire outer diameter OD (mm) is in the range 200≤OD≤660, and the total tire width SW (mm) is in the range 100≤SW≤400. The strength Tcs (N/50 mm) per a width of 50 mm of the carcass ply constituting the carcass layer 13 is in the range 17≤Tcs/OD≤120 with respect to the tire outer diameter OD (mm).

In such a configuration, since the load capacity of the carcass layer 13 is appropriately ensured in the small-diameter tire, there is an advantage of providing the wear resistance performance and the low rolling resistance performance of the tire in a compatible manner. Specifically, the lower limit of the ratio Tcs/OD suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit of the ratio Tcs/OD suppresses the deterioration of the rolling resistance caused by the increase in the weight of the carcass layer.

In the tire 1, the carcass ply of the carcass layer 13 is configured by covering, with a coating rubber, the carcass cords made of steel. The cord diameter φcs (mm) of the carcass cord is in the range 0.3≤φcs≤1.1 and the number of insertions Ecs (piece/50 mm) of the carcass cords is in the range 25≤Ecs≤80. As a result, there is an advantage that the above-described strength Tcs of the carcass layer 13 is achieved.

In the tire 1, the carcass ply of the carcass layer 13 is configured by covering, with a coating rubber, the carcass cords made of organic fiber. The cord diameter φcs (mm) of the carcass cord is in the range 0.6≤φcs≤0.9 and the number of insertions Ecs (piece/50 mm) of the carcass cords is in the range 40≤Ecs≤70. As a result, there is an advantage that the above-described strength Tcs of the carcass layer 13 is achieved.

In the tire 1, the carcass layer 13 includes the body portion 131 extending along the tire inner surface and the turned-up portion 132 turned up outer side in the tire width direction so as to wrap around the bead 11 and extends in the tire radial direction (see FIG. 1). The radial height Hcs (mm) from the measurement point of the rim diameter RD to the end portion of the turned-up portion 132 of the carcass layer 13 is in the range 0.49≤Hcs/SH≤0.80 with respect to the tire cross-sectional height SH (mm) (see FIG. 2). Thus, there is an advantage that the radial height Hcs of the turned-up portion 132 of the carcass layer 13 is made appropriate. Specifically, the lower limit ensures the load capacity of the tire side portion, and the upper limit suppresses the deterioration of the rolling resistance caused by the increase in the weight of the carcass layer.

Additionally, in the tire 1, the contact height Hcs' (mm) of the body portion 131 and the turned-up portion 132 of the carcass layer 13 is in the range 0.07≤Hcs'/SH with respect to the tire cross-sectional height SH (mm) (see FIG. 2). This has an advantage that the load capacity of the tire side portion is effectively enhanced.

In the tire 1, the distance Tsh in the tire ground contact edge T is in the range 1.50≤Tsh/Tu≤6.90 with respect to the rubber gauge Tu (mm) from the end portion of the wide cross belt 141 to the outer circumferential surface of the carcass layer 13 (see FIG. 5). Accordingly, it is advantageous that the profile of the carcass layer 13 is properly set and tension of the carcass layer 13 is properly set.

In the tire 1, the distance ΔBu' (mm) from the point Bc to the point Bu' in the tire width direction is in the range 1.10≤ΔBu'/ΔAu'≤8.00 with respect to the distance ΔAu' (mm) from the tire maximum width position Ac to the point Au' in the tire width direction (see FIG. 7). Accordingly, there is an advantage that the relationship between the degree of curvature of the side profile and the degree of curvature of the carcass profile in the region on the outer side in the radial direction is properly set. Specifically, the lower limit ensures the cut resistance performance of the tire side portion. The upper limit ensures the tension of the carcass layer 13, ensures the rigidity of the tire side portion, and ensures the load capacity and the durability performance of the tire.

In addition, in the tire 1, the distance ΔBl' (mm) from the point Bc to the point Bl' in the tire width direction is in the range 1.80≤ΔBl'/ΔAl'≤11.0 with respect to the distance ΔAl' (mm) from the tire maximum width position Ac to the point Al' in the tire width direction (see FIG. 7). Accordingly, there is an advantage that the relationship between the degree of curvature of the side profile and the degree of curvature of the carcass profile in the region on the inner side in the radial direction is properly set. Specifically, the lower limit ensures the total gauge Gl of the tire side portion and ensures the load capacity of the tire side portion. The upper limit ensures the radius of curvature RcC of the carcass profile, ensures the internal volume V of the tire, and ensures the load capacity of the tire.

In addition, in the tire 1, the amount of depression DA (mm) of the tread profile at the tire ground contact edge T has the relationship 0.008≤DA/TW≤0.060 with respect to the tire ground contact width TW (mm) (see FIG. 4). As a result, there is an advantage that the depression angle (defined by the ratio DA/(TW/2)) of the tread portion shoulder region is properly set and the load capacity of the tread portion is appropriately ensured. Specifically, the lower limit ensures the depression angle of the tread portion shoulder region and suppresses a decrease in wear life caused by an excessive ground contact pressure of the tread portion shoulder region. The upper limit flattens the tire ground contact region, uniforms the ground contact pressure, and ensures the wear resistance performance of the tire. In particular, since the small-diameter tire is assumed to be used under a high internal pressure and a high load, the ground contact pressure distribution in the tire ground contact region can be effectively properly set by the configuration.

In the tire 1, the belt layer 14 includes the pair of cross belts 141, 142 formed by belt cords made of steel covered with a coating rubber (see FIG. 1). Further, the strength Tbt (N/50 mm) per the width of 50 mm of each of the pair of cross belts 141, 142 is in the range 25≤Tbt/OD≤250 with respect to the tire outer diameter OD (mm). As a result, there is an advantage that the load capacity of the cross belts 141, 142 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the cross belt.

Further, in the tire 1, the strength Tbd (N) of one bead core 11 is in the range 45≤Tbd/OD≤120 with respect to the tire outer diameter OD (mm). As a result, there is an advantage that the load capacity of the bead core 11 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the bead core.

In the tire 1, the bead core 11 is constituted by the bead wire made of steel. The total cross-sectional area σbd (mm2) of the bead wire is in the range 0.025≤σbd/OD≤0.075 with respect to the tire outer diameter OD (mm). Thereby, there is an advantage that the above-described strength Tbd (N) of the bead core 11 is achieved.

Examples

FIGS. 8A to 10B are tables showing results of performance tests of tires according to embodiments of the technology.

In the performance tests, (1) low rolling resistance performance (fuel economy consumption rate), (2) wear resistance performance, and (3) load durability performance were evaluated for a plurality of types of test tires. As an example of the small-diameter tire, test tires having two types of tire sizes are used. Specifically, [A] a test tire having a tire size of 235/45R10 is mounted on a rim having a rim size of 10×8, and [B] a test tire having a tire size of 145/80R12 is mounted on a rim having a rim size of 12×4.00B.

(1) In the evaluation for the low rolling resistance performance, an internal pressure of 230 kPa and a load of 4.2 kN are applied to the test tire [A], and an internal pressure of 80% of the prescribed internal pressure of JATMA and a load of 80% of the prescribed load of JATMA are applied to the test tire [B]. In addition, a four wheeled low-floor vehicle with the test tires mounted on all wheels travels 50 rounds on a test course having a total length of 2 km at a speed of 100 km/h. Thereafter, the fuel economy consumption rate (km/l) is calculated and evaluated. In the evaluation, the results are expressed as index values and evaluated, with Comparative Example being assigned as the reference (100). The larger the value is, the smaller the fuel economy consumption rate is and the rolling resistance tends to decrease, which are preferable.

(2) In the evaluation for wear resistance performance, an internal pressure of 230 kPa and a load of 4.2 kN are applied to the test tire [A], and an internal pressure of 80% of the prescribed internal pressure of JATMA and a load of 80% of the prescribed load of JATMA are applied to the test tire [B]. In addition, a four wheeled low-floor vehicle with the test tires mounted on all wheels travels 10000 km on a dry road surface of a test course. Thereafter, the amount of wear and the degree of uneven wear of each tire are measured and evaluated. The results are expressed as index values and evaluated, with Comparative Example being assigned as the reference (100). In the evaluation, larger values are preferable.

(3) In the evaluation for durability performance, an indoor drum testing machine having a drum diameter of 1707 mm is used, an internal pressure of 230 kPa and a load of 4.2 kN are applied to the test tire [A], and an internal pressure of 80% of the prescribed internal pressure of JATMA and a load of 88% of the prescribed load of JATMA are applied to the test tire [B]. The travel distance until tire failure is measured while increasing the load by 13% every 2 hours at the travel speed of 81 km/h. Then, the results are expressed as index values and evaluated, with Comparative Example being assigned as the reference (100). In this evaluation, larger values are preferable.

The test tire of Example has the structure illustrated in FIG. 1, and includes the pair of bead cores 11, 11, the carcass layer 13 formed of a single layered carcass ply, the pair of cross belts 141, 142, the belt layer 14 formed of the belt cover 143 and the pair of belt edge covers 144, 144, the tread rubber 15, the sidewall rubber 16, and the rim cushion rubber 17.

In the test tire of Comparative Example, the tire outer diameter OD=531 mm, the total tire width SW=143 mm, and the tire ground contact width TW=123 mm in the test tire of Example 1, and the test tire is mounted on a rim having a rim size of 12.

As shown by the test results, it is found that the test tires of Examples provide the low rolling resistance performance, the wear resistance performance, and the durability performance of the tire in a compatible manner.

The invention claimed is:

1. A tire comprising:

a pair of bead cores;

a carcass layer extending between the bead cores; and a belt layer disposed on an outer side of the carcass layer in a radial direction, a tire outer diameter OD (mm) being in a range $200 \leq OD \leq 660$;

a total tire width SW (mm) being in a range $100 \leq SW \leq 400$; and a strength Tcs (N/50 mm) per a width of 50 mm of a carcass ply constituting the carcass layer being in a range $17 \leq Tcs/OD \leq 120$ with respect to the tire outer diameter OD (mm); wherein in a cross-sectional view in a tire meridian direction, a tire maximum width position Ac, a point Al on a side profile of the tire at a same position as an end portion on an outer side in a radial direction of the bead core in a tire radial direction, a distance Hl radially inward from the tire maximum width position Ac to the point Al in the tire radial direction, and a point Al' on the side profile at a radial position of 70% of the distance Hl radially inward from the tire maximum width position Ac are defined, and a distance ΔBl' (mm) from a point Bc to a point Bl' in a tire width direction is in a range $1.80 \leq \Delta Bl/\Delta Al' \leq 11.0$ with respect to a distance ΔAl' (mm) from the tire maximum width position Ac to the point Al' in the tire width direction, the point Bc being a point on the body portion of the carcass layer at a same position as the tire maximum width position Ac in the tire radial direction and the point Bl' being a point on the body portion of the carcass layer at a radial position of 70% of the distance Hu radially inward from the tire maximum width position Ac.

2. A tire comprising:

a pair of bead cores;

a carcass layer extending between the bead cores; and a belt layer disposed on an outer side of the carcass layer in a radial direction, a tire outer diameter OD (mm) being in a range $200 \leq OD \leq 660$;

a total tire width SW (mm) being in a range $100 \leq SW \leq 400$; and a strength Tcs (N/50 mm) per a width of 50 mm of a carcass ply constituting the carcass layer being in a range $17 \leq Tcs/OD \leq 120$ with respect to the tire outer diameter OD (mm); wherein in a cross-sectional view in a tire meridian direction, a tire maximum width position Ac, a point Au on a side profile of the tire at a same position as an end portion of an innermost layer of the belt layer in a tire radial direction, a distance Hu radially outward from the tire maximum width position Ac to the point Au in the tire radial direction, and a point Au' on the side profile of the tire at a radial position of 70% of the distance Hu radially outward from the tire maximum width position Ac are defined, and a distance ΔBu' (mm) from a point Bc to a point Bu' in a tire width direction is in a range $1.10 \leq \Delta Bu'/\Delta Au' \leq 8.00$ with respect to a distance $\Delta Au'$ (mm) from the tire maximum width position Ac to the point Au' in the tire width direction, the point Bc being a point on the body portion of the carcass layer at a same position as the tire maximum width position Ac in the tire radial direction and the point Bu' being a point on the body portion of the carcass layer at a radial position of 70% of the distance Hu radially outward from the tire maximum width position Ac.

3. The tire according to claim 2, wherein the carcass ply of the carcass layer is configured by covering a carcass cord made of organic fiber with a coating rubber, the carcass cord has a cord diameter φcs (mm) in a range $0.6 \leq \varphi cs \leq 0.9$, and the carcass cord has a number of insertions Ecs (piece/50 mm) in a range $40 \leq Ecs \leq 70$.

4. The tire according to claim 2, wherein a distance Tsh in a tire ground contact edge is in a range $1.50 \leq Tsh/Tu \leq 6.90$ with respect to a rubber gauge Tu (mm) from an end portion of the wide cross belt to an outer circumferential surface of the carcass layer.

5. The tire according to claim 2, wherein in a cross-sectional view in a tire meridian direction, a tire maximum width position Ac, a point Al on a side profile of the tire at a same position as an end portion on an outer side in a radial direction of the bead core in a tire radial direction, a distance Hl radially inward from the tire maximum width position Ac to the point Al in the tire radial direction, and a point Al' on the side profile at a radial position of 70% of the distance Hl radially inward from the tire maximum width position Ac are defined, and a distance $\Delta Bl'$ (mm) from a point Bc to a point Bl' in a tire width direction is in a range $1.80 \leq \Delta Bl'/\Delta Al' \leq 11.0$ with respect to a distance $\Delta Al'$ (mm) from the tire maximum width position Ac to the point Al' in the tire width direction, the point Bc being a point on the body portion of the carcass layer at a same position as the tire maximum width position Ac in the tire radial direction and the point Bl' being a point on the body portion of the carcass layer at a radial position of 70% of the distance Hu radially inward from the tire maximum width position Ac.

6. The tire according to claim 2, wherein an amount of depression DA (mm) of a tread profile at a tire ground contact edge has a relationship $0.008 \leq DA/TW \leq 0.060$ with respect to a tire ground contact width TW.

7. The tire according to claim 2, wherein the belt layer comprises a pair of cross belts formed by covering a belt cord made of steel with a coating rubber, and a strength Tbt (N/50 mm) per a width of 50 mm of each of the pair of cross belts is in a range $25 \leq Tbt/OD \leq 250$ with respect to the tire outer diameter OD (mm).

8. The tire according to claim 2, wherein the carcass layer comprises a body portion and a turned-up portion, the body portion extends along a tire inner surface, the turned-up portion is turned up to an outer side in a tire width direction so as to wrap around the bead cores and extends in a tire radial direction, and a radial height Hcs (mm) from a measurement point of a rim diameter RD to an end portion of the turned-up portion is in a range $0.49 \leq Hcs/SH \leq 0.80$ with respect to a tire cross-sectional height SH (mm).

9. The tire according to claim 8, wherein a contact height Hcs' (mm) of the body portion and the turned-up portion of the carcass layer is in a range $0.07 \leq Hcs'/SH$ with respect to the tire cross-sectional height SH (mm).

10. The tire according to claim 2, wherein a strength Tbd (N) of the one bead core is in a range $45 \leq Tbd/OD \leq 120$ with respect to the tire outer diameter OD (mm).

11. The tire according to claim 10, wherein the bead core is constituted by a bead wire made of steel, and a total cross-sectional area σbd (mm2) of the bead wire is in a range $0.025 \leq \sigma bd/OD \leq 0.075$ with respect to the tire outer diameter OD (mm).

12. The tire according to claim 2, wherein the carcass ply of the carcass layer is configured by covering a carcass cord made of steel with a coating rubber, the carcass cord has a cord diameter pcs (mm) in a range $0.3 \leq \varphi cs \leq 1.1$, and the carcass cord has a number of insertions Ecs (piece/50 mm) in a range $25 \leq Ecs \leq 80$.

13. The tire according to claim 12, wherein the carcass layer comprises a body portion and a turned-up portion, the body portion extends along a tire inner surface, the turned-up portion is turned up to an outer side in a tire width direction so as to wrap around the bead cores and extends in a tire radial direction, and a radial height Hcs (mm) from a measurement point of a rim diameter RD to an end portion of the turned-up portion is in a range $0.49 \leq Hcs/SH \leq 0.80$ with respect to a tire cross-sectional height SH (mm).

14. The tire according to claim 13, wherein a contact height Hcs' (mm) of the body portion and the turned-up portion of the carcass layer is in a range $0.07 \leq Hcs'/SH$ with respect to the tire cross-sectional height SH (mm).

15. The tire according to claim 14, wherein a distance Tsh in a tire ground contact edge is in a range $1.50 \leq Tsh/Tu \leq 6.90$ with respect to a rubber gauge Tu (mm) from an end portion of the wide cross belt to an outer circumferential surface of the carcass layer.

16. The tire according to claim 15, wherein in a cross-sectional view in a tire meridian direction, a tire maximum width position Ac, a point Al on a side profile of the tire at a same position as an end portion on an outer side in a radial direction of the bead core in a tire radial direction, a distance Hl radially inward from the tire maximum width position Ac to the point Al in the tire radial direction, and a point Al' on the side profile at a radial position of 70% of the distance Hl radially inward from the tire maximum width position Ac are defined, and a distance $\Delta Bl'$ (mm) from a point Bc to a point Bl' in a tire width direction is in a range $1.80 \leq \Delta Bl'/\Delta Al' \leq 11.0$ with respect to a distance $\Delta Al'$ (mm) from the tire maximum width position Ac to the point Al' in the tire width direction, the point Bc being a point on the body portion of the carcass layer at a same position as the tire maximum width position Ac in the tire radial direction and the point Bl' being a point on the body portion of the carcass layer at a radial position of 70% of the distance Hu radially inward from the tire maximum width position Ac.

17. The tire according to claim 16, wherein an amount of depression DA (mm) of a tread profile at a tire ground contact edge has a relationship $0.008 \leq DA/TW \leq 0.060$ with respect to a tire ground contact width TW.

18. The tire according to claim 17, wherein the belt layer comprises a pair of cross belts formed by covering a belt cord made of steel with a coating rubber, and a strength Tbt (N/50 mm) per a width of 50 mm of each of the pair of cross belts is in a range $25 \leq Tbt/OD \leq 250$ with respect to the tire outer diameter OD (mm).

19. The tire according to claim 18, wherein a strength Tbd (N) of the one bead core is in a range $45 \leq Tbd/OD \leq 120$ with respect to the tire outer diameter OD (mm), the bead core is constituted by a bead wire made of steel, and a total cross-sectional area $\sigma bd$ (mm2) of the bead wire is in a range $0.025 \leq \sigma bd/OD \leq 0.075$ with respect to the tire outer diameter OD (mm).

* * * * *